(12) United States Patent
Dulaney et al.

(10) Patent No.: US 11,955,763 B2
(45) Date of Patent: *Apr. 9, 2024

(54) METHOD AND APPARATUS FOR USE IN LASER SHOCK PEENING

(71) Applicant: Sunrise International, Inc., Marietta, GA (US)

(72) Inventors: Jeff Dulaney, Dublin, OH (US); David W. Sokol, Dublin, OH (US); Mark E. O'Loughlin, Galloway, OH (US); Keith Glover, Dublin, OH (US); Gary May, Plain City, OH (US)

(73) Assignee: Sunrise International, Inc., Marietta, GA (US)

( * ) Notice: Subject to any disclaimer, the term of this patent is extended or adjusted under 35 U.S.C. 154(b) by 657 days.

This patent is subject to a terminal disclaimer.

(21) Appl. No.: 17/027,632

(22) Filed: Sep. 21, 2020

(65) Prior Publication Data

US 2021/0083446 A1    Mar. 18, 2021

Related U.S. Application Data

(63) Continuation of application No. 15/541,584, filed as application No. PCT/US2016/012666 on Jan. 8, 2016, now Pat. No. 10,819,079.

(Continued)

(51) Int. Cl.
*H01S 3/06* (2006.01)
*B23K 26/06* (2014.01)
(Continued)

(52) U.S. Cl.
CPC .......... *H01S 3/061* (2013.01); *B23K 26/0622* (2015.10); *B23K 26/356* (2015.10);
(Continued)

(58) Field of Classification Search
None
See application file for complete search history.

(56) References Cited

U.S. PATENT DOCUMENTS

| 5,022,033 A | 6/1991 | Hackell |
| 5,127,019 A | 6/1992 | Epstein et al. |

(Continued)

FOREIGN PATENT DOCUMENTS

| CN | 102334249 A | 1/2012 |
| CN | 104201556 A | 12/2014 |

(Continued)

OTHER PUBLICATIONS

International Search Report and Written Opinion issued in PCT/US2020/043125 dated Jan. 24, 2023.

(Continued)

*Primary Examiner* — Geoffrey S Evans

(57) ABSTRACT

An apparatus may include a diode-pumped solid-state laser oscillator configured to output a pulsed laser beam, a modulator configured to modify an energy and a temporal profile of the pulsed laser beam, and an amplifier configured to amplify an energy of the pulse laser beam. A modified and amplified beam to laser peen a target part may have an energy of about 5 J to about 10 J, an average power (defined as energy (J)×frequency (Hz)) of from about 25 W to about 200 W, with a flattop beam uniformity of less than about 0.2. The diode-pumped solid-state oscillator may be configured to output a beam having both a single longitudinal mode and a single transverse mode, and to produce and output beams at a frequency of about 20 Hz.

15 Claims, 20 Drawing Sheets

Related U.S. Application Data

(60) Provisional application No. 62/101,442, filed on Jan. 9, 2015.

(51) Int. Cl.
*B23K 26/0622* (2014.01)
*B23K 26/356* (2014.01)
*C21D 10/00* (2006.01)
*H01S 3/00* (2006.01)
*H01S 3/08031* (2023.01)
*H01S 3/0941* (2006.01)
*H01S 3/10* (2006.01)
*H01S 3/105* (2006.01)
*H01S 3/1123* (2023.01)
*H01S 3/139* (2006.01)
*H01S 3/16* (2006.01)
*H01S 3/23* (2006.01)

(52) U.S. Cl.
CPC ............ *C21D 10/005* (2013.01); *H01S 3/005* (2013.01); *H01S 3/0064* (2013.01); *H01S 3/0085* (2013.01); *H01S 3/0092* (2013.01); *H01S 3/08031* (2013.01); *H01S 3/09415* (2013.01); *H01S 3/1003* (2013.01); *H01S 3/10092* (2013.01); *H01S 3/105* (2013.01); *H01S 3/1123* (2023.01); *H01S 3/139* (2013.01); *H01S 3/1611* (2013.01); *H01S 3/1653* (2013.01); *H01S 3/2316* (2013.01); *H01S 3/2308* (2013.01); *H01S 2301/02* (2013.01)

(56) References Cited

U.S. PATENT DOCUMENTS

| | | |
|---|---|---|
| 5,181,223 A | 1/1993 | Baer et al. |
| 5,239,408 A | 8/1993 | Hackel et al. |
| 5,268,787 A | 12/1993 | McIntyre |
| 5,285,310 A | 2/1994 | Miller et al. |
| 5,329,090 A | 7/1994 | Woelki et al. |
| 5,430,748 A | 7/1995 | MacCormack et al. |
| 5,689,363 A | 11/1997 | Dane et al. |
| 6,057,003 A | 5/2000 | Dulaney et al. |
| 6,075,593 A | 6/2000 | Trantow et al. |
| 6,198,069 B1 | 3/2001 | Hackel et al. |
| 6,197,133 B1 | 6/2001 | Unternahrer |
| 6,259,055 B1 | 7/2001 | Sokol et al. |
| 6,366,308 B1 | 2/2002 | Hawryluk et al. |
| 6,373,876 B1 | 4/2002 | Dulaney et al. |
| 6,384,966 B1 | 5/2002 | Dymott et al. |
| 6,657,160 B2 | 12/2003 | Hackel et al. |
| 6,775,053 B2 | 8/2004 | Jovanovic |
| 6,805,970 B2 | 10/2004 | Hackel et al. |
| 6,818,854 B2 | 11/2004 | Friedman et al. |
| 6,917,012 B2 | 7/2005 | Perozek et al. |
| 6,917,631 B2 | 7/2005 | Richardson et al. |
| 7,006,283 B2 | 2/2006 | Lefort |
| 7,095,761 B2 | 8/2006 | Um |
| 7,095,772 B1 | 8/2006 | Delfyett et al. |
| 7,110,171 B2 | 9/2006 | Dane et al. |
| 7,110,174 B2 | 9/2006 | Dane et al. |
| 7,180,918 B2 | 2/2007 | Dane et al. |
| 7,209,500 B2 | 4/2007 | Dane et al. |
| 7,233,607 B2 | 6/2007 | Richardson et al. |
| 7,286,580 B2 | 10/2007 | Dane et al. |
| 7,291,805 B2 | 11/2007 | Dane et al. |
| 7,386,211 B1 | 6/2008 | Di Teodoro et al. |
| 7,391,561 B2 | 6/2008 | Di Teodoro et al. |
| 7,430,352 B2 | 9/2008 | Di Teodoro et al. |
| 7,440,175 B2 | 10/2008 | Di Teodoro et al. |
| 7,508,853 B2 | 3/2009 | Harter et al. |
| 7,558,302 B1 | 7/2009 | Defyett et al. |
| 7,573,001 B2 | 8/2009 | Dane et al. |
| 7,718,921 B2 | 5/2010 | Dane et al. |
| 7,750,266 B2 | 7/2010 | Dane et al. |
| 7,782,912 B2 | 8/2010 | Harter et al. |
| 7,851,725 B2 | 12/2010 | Dane et al. |
| 8,094,691 B2 | 1/2012 | Harter et al. |
| 8,207,474 B2 | 6/2012 | Dane et al. |
| 8,233,511 B2 | 7/2012 | Bayramian |
| 8,509,270 B2 | 8/2013 | Harter et al. |
| 8,526,473 B2 | 9/2013 | Baird et al. |
| 9,744,618 B2 | 8/2017 | Sokol |
| 10,232,470 B2 | 3/2019 | Sokol |
| 10,819,079 B2 * | 10/2020 | Dulaney .............. C21D 10/005 |
| 2002/0000428 A1 | 1/2002 | Dulaney et al. |
| 2002/0031158 A1 | 3/2002 | Kleinschmidt |
| 2002/0096503 A1 | 7/2002 | Hackel et al. |
| 2003/0058542 A1 | 3/2003 | Akiyama et al. |
| 2003/0062468 A1 | 4/2003 | Byren et al. |
| 2003/0026300 A1 | 6/2003 | Biedron et al. |
| 2003/0161375 A1 | 8/2003 | Filgas et al. |
| 2004/0136430 A1 | 7/2004 | Tsunekane et al. |
| 2004/0179571 A1 | 9/2004 | Govorkov et al. |
| 2004/0228376 A1 | 11/2004 | Dane et al. |
| 2005/0094250 A1 | 5/2005 | Dane et al. |
| 2005/0120803 A1 | 6/2005 | Sokol et al. |
| 2006/0102609 A1 | 5/2006 | Dane et al. |
| 2007/0091948 A1 | 4/2007 | Di Teodoro et al. |
| 2007/0104230 A1 | 5/2007 | Kopf et al. |
| 2009/0245301 A1 | 10/2009 | Peng et al. |
| 2010/0177794 A1 | 7/2010 | Peng et al. |
| 2010/0197116 A1 | 8/2010 | Shah et al. |
| 2010/0208248 A1 | 8/2010 | Ochiai et al. |
| 2011/0058249 A1 | 3/2011 | Erlandson |
| 2011/0253690 A1 | 10/2011 | Dane et al. |
| 2011/0261844 A1 | 10/2011 | Abe et al. |
| 2012/0092755 A1 * | 4/2012 | Baird ................... H01S 3/2316 359/337.2 |
| 2012/0152918 A1 | 6/2012 | Li et al. |
| 2012/0325788 A1 | 12/2012 | Sokol et al. |
| 2013/0250285 A1 | 9/2013 | Bridges et al. |
| 2014/0300951 A1 | 10/2014 | Messerly et al. |
| 2015/0336208 A1 | 11/2015 | Sokol et al. |
| 2018/0001417 A1 | 1/2018 | Dulaney et al. |

FOREIGN PATENT DOCUMENTS

| | | |
|---|---|---|
| EP | 1511134 A2 | 3/2005 |
| EP | 1905140 A1 | 4/2008 |
| JP | 2002057395 A | 2/2002 |
| JP | 2004227011 A | 8/2004 |
| JP | 2005045211 A | 2/2005 |
| JP | 2007514307 | 5/2007 |
| JP | 2008122985 A | 5/2008 |
| JP | 2008520822 | 6/2008 |
| JP | 2009265683 A | 11/2009 |
| JP | 2012509464 | 4/2012 |
| JP | 2012515450 | 7/2012 |
| JP | 2014504956 | 2/2014 |
| WO | 9215985 A1 | 9/1992 |
| WO | 9525821 A1 | 9/1995 |
| WO | 2014007900 A2 | 1/2014 |
| WO | 2020072512 A1 | 4/2020 |

OTHER PUBLICATIONS

Notice of Requisition issued in Canadian Patent Application No. 2,973,382, dated May 4, 2022.
Notice of Requisition issued in Canadian Patent Application No. 2,973,382, dated Mar. 21, 2022.
International Search Report in International Application No. PCT/US2016/012666, dated May 17, 2016 (20 pages).
State Intellectual Property Office of the P.R.C., Chinese Office Action issued in Chinese Application No. 201680003518.8, dated Jul. 17, 2018 (8 pages).
European Patent Office, Supplementary Partial European Search Report and Provisional Opinion in European Patent Application No. 16735482.8, dated Sep. 17, 2018 (15 pages).

(56) References Cited

OTHER PUBLICATIONS

State Intellectual Property Office of the P.R.C., Second Office Action issued in Chinese Application No. 201680003518.8, dated Dec. 17, 2018 (9 pages).

Esherick, P. et al., "Polarization feedback stabilization of an injection-seeded Nd:YAG laser for spectroscopic applications," Journal of the Optical Society of America—B, vol. 4, No. 1, Jan. 1987, pp. 41-47, XP000709832, ISSN: 0740-3224 (7 pages).

Slipchenko, M.N. et al., "100 kHz, 100 ms, 400 J burst-mode laser with dual-wavelength diode-pumped amplifiers," Optics Letters, vol. 39, No. 16, Aug. 15, 2014, pp. 4735-4738, XP001591411, ISSN: 0146-9592 (4 pages).

Yu, J. et al., "125-mJ diode-pumped injection-seeded Ho:Tm:YLF Laser," Optics Letters, vol. 23, No. 10, May 15, 1998, pp. 780-782, XP000765393, ISSN: 0146-9592 (3 pages).

European Patent Office, Extended European Search Report in European Patent Application No. 19191239, dated Nov. 29, 2019 (13 pages).

Fuest, F. et al., "Ultrahigh laser pulse energy and power generation at 10 kHz," Optics Letters, vol. 37, No. 15, Aug. 1, 2012, pp. 3231-3233, ISSN: 0146-9592 (3 pages).

Japanese Patent Office, Notice of Reasons for Refusal issued in Japanese Patent Application No. 2017-536859, dated Feb. 4, 2020 (5 pages).

State Intellectual Property Office of the P.R.C., First Office Action issued in Chinese Application No. 201910851274.4, dated Dec. 17, 2018 (9 pages).

European Patent Office, Supplementary European Search Report and Opinion in European Patent Application No. 16735482.8, dated Jan. 4, 2019 (19 pages).

Indian Patent Office, First Examination Report issued in Indian Patent Application No. 201717024612, dated Nov. 28, 2020 (7 pages).

\* cited by examiner

1600

```
producing and outputting a pulsed laser beam having a first
energy, a first beam diameter, and a first temporal profile from an
oscillator having a diode-pumped laser rod (1601)
                            ↓
receiving the beam output by the oscillator at a pulse slicer (1603)
                            ↓
modifying the first temporal profile of the beam with the pulse
slicer to a second energy and a second temporal profile (1605)
                            ↓
outputting the modified beam having the second energy and the
second temporal profile from the pulse slicer to an amplifier
(1607)
                            ↓
receiving and amplifying the modified beam with the amplifier
from the second energy to a third energy with a second beam
diameter greater than the first beam diameter (1609)
                            ↓
outputting the beam having the third energy, the second beam
diameter, the second temporal profile from the amplifier to the
target part for laser shock peening the target part (1611)
```

FIG. 16

```
2000
```

Adjusting a final focusing lens on a laser beam delivery system based on a user-defined parameters prior to laser shock peening a target part (2001)

adjusting a position of a mirror on a laser beam delivery system based on a user-defined target location prior to LSP of the target part (2003)

firing a test pulse at a calibrated energy meter to determine the energy of the beam output by the apparatus (2005)

adjusting components of the apparatus for LSP and re-firing a test laser at the calibrated energy meter until the measured energy is within a tolerance of the user-defined energy to calibrate the beam (2007);

firing a calibrated beam at a target part for LSP and measuring the calibrated beam parameters at a pickoff position in the beam (2009)

comparing the measured parameters against user-defined parameters (2011)

repeatedly adjusting the parameters of the output beam by adjusting the final focusing lens, adjusting the position of a mirror in a laser beam delivery device, and adjusting a pulse slicer, and re-measuring the parameters until the parameters are within a tolerance of the user-defined parameters (2013)

FIG. 20

METHOD AND APPARATUS FOR USE IN LASER SHOCK PEENING

CROSS-REFERENCE TO RELATED APPLICATIONS

This application is a continuation application of U.S. patent application Ser. No. 15/541,584, filed on Jul. 5, 2017, which is the national stage application of Internal Application No. PCT/US2016/012666, filed on Jan. 8, 2016, which claims the benefit of priority to U.S. Provisional Patent Application No. 62/101,442, filed on Jan. 9, 2015, which applications are incorporated herein by reference in their entirety.

TECHNICAL FIELD

The present application relates to laser shock peening.

BACKGROUND

The laser shock peening ("LSP") process, a substitute or complementary process for traditional shot peening, is a cold working process used to produce a deep (e.g., more than 1 mm) compressive residual stress layer and modify mechanical properties of materials by impacting the material with enough force to create plastic deformation. The residual stresses created by the LSP process increase a material's resistance to fatigue and stress, and thereby significantly increase the life of laser peened parts. LSP uses high energy laser pulses to generate a plasma plume and cause a rapid rise of pressure on the surface of a part. This pressure creates and sustains a high-intensity shockwave, which propagates into the surface of the part. The shockwave generated by LSP induces cold work into the microstructure of the part material and contributes to the increased performance of the part.

As the shockwave travels into the part, some of the energy of the wave is absorbed during the plastic deformation of the part material. This is also known as cold working. LSP typically uses a laser pulse width of about 8 nanoseconds (ns) to about 40 ns. A typical spot diameter for a laser beam in LSP is about 1.0 mm to about 8.0 mm. Fluence is the measure of energy delivered per unit area. In LSP applications, fluence is typically over 100 J/cm$^2$. Power density must be greater than the Hugoniot elastic limit (HEL) of the material to induce plastic deformation and the associated compressive residual stress. Although the HEL for some materials is as low as about 3 GW/cm$^2$, the typical power densities used for laser peening are typically in the 6 GW/cm$^2$ to 12 GW/cm$^2$ range.

Lasers using flashlamp-pumped gain media may be used to produce laser pulses with sufficient energy for use in LSP applications. Flashlamps may produce pump light in a wide bandwidth with wavelengths ranging over both the visible light and infrared portions of the electromagnetic spectrum. Gain media do not readily use most of the light produced by flashlamps, and light not usefully absorbed by a gain medium may produce excess heat. Excess heat limits the repetition rate and the power output of a laser, and requires additional cooling systems to maintain an operational temperature of the laser. A flash-lamp pumped laser and support system to keep the laser in operation may not be easily transported without significant logistics to move the necessary components.

Flashlamp-pumped lasers are electrically inefficient which may lead to beam distortions. Flashlamp-pumped lasers may also require higher operating voltages and currents, which may limit their operation to locations with high voltage and high current industrial service. An operational life of a flashlamp may be limited to several million pulses, which may necessitate increased maintenance and costs to keep flash-pumped lasers in service.

SUMMARY

An apparatus may include a diode-pumped solid-state laser (DPSSL) oscillator configured to output a pulsed laser beam having a first energy and a first temporal profile. The apparatus may further include a modulator and an amplifier. The modulator may be configured to receive the pulsed laser beam from the DPSSL oscillator, to modify the pulsed laser beam from the first energy to a second energy, and to modify the first temporal profile to a second temporal profile, and to output a beam having the second energy and the second temporal profile. The amplifier may have multiple stages. For example, a first stage may be configured to receive the beam having the second energy and the second temporal profile, to amplify the beam from the second energy to a third energy, to modify the beam from the second temporal profile to a third temporal profile, and to output a beam having the third energy and the third temporal profile. A second stage may be configured to receive the beam having the third energy, to amplify the beam from the third energy to a fourth energy, to modify the beam from the third temporal profile to a fourth temporal profile, and to output a beam having the fourth energy and the fourth temporal profile.

The apparatus may further include a DPSSL oscillator having an optical cavity and configured to produce and to output a pulsed laser beam; and an injection seeder configured to output a seed laser into the optical cavity to produce and output a pulsed laser beam of a single longitudinal mode.

A method for laser shock peening a target part may include outputting a pulsed laser beam having a first energy, a first beam diameter, and a first temporal profile. The method may further include modifying the beam having the first energy and the first temporal profile to a second energy and a second temporal profile. The method may further include amplifying the beam having the second energy to a third energy and modifying the beam to a second beam diameter greater than the first beam diameter, and modifying the second temporal profile to a third temporal profile. The method may include outputting the beam having the third energy, the second beam diameter, and the third temporal profile to the target part for laser shock peening the target part.

BRIEF DESCRIPTION OF THE DRAWINGS

FIG. 16 is a flowchart of an example method of using an apparatus for laser peening a target part.

FIG. 20 is a flowchart of an example method for adjusting and calibrating an example apparatus for use in an LSP system.

DESCRIPTION OF EMBODIMENTS

Figure 1:
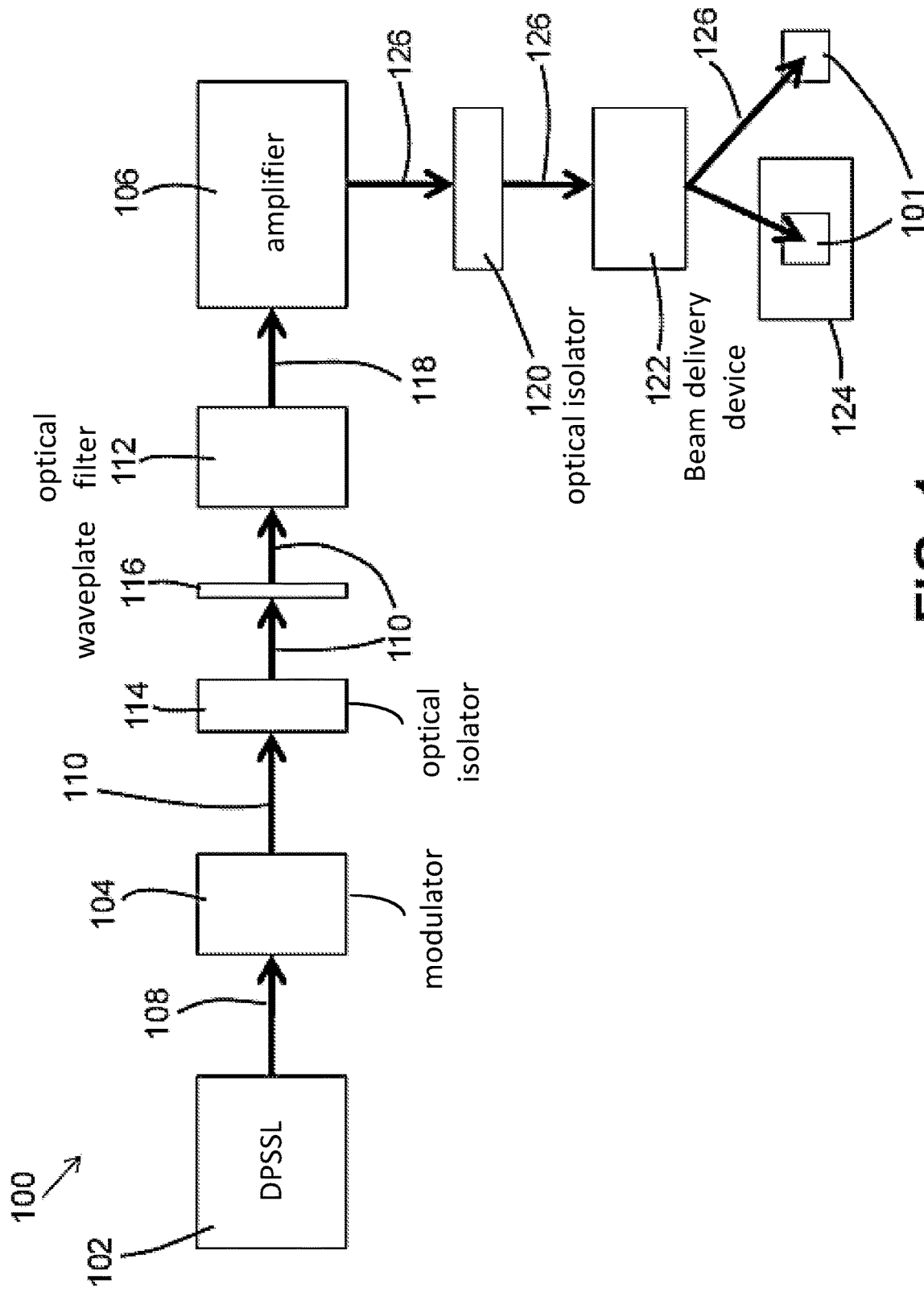
FIG. 1 is a schematic diagram of an example apparatus for use in a laser shock peening process.

With reference to FIG. 1, an example apparatus 100 for use in laser shock peening is illustrated. The apparatus 100 is operative to produce and output a laser beam to a target part 101 for laser shock peening (LSP) the target part 101.

The apparatus 100 may include a DPSSL oscillator 102, a modulator 104, and an amplifier 106. The DPSSL oscillator 102 is configured to produce and output a pulsed laser beam 108 to the modulator 104, which may modify the pulsed laser beam 108 and output a modified beam 110 to the amplifier 106. The apparatus 100 may also include an optical filter 112, an optical isolator 114, and a waveplate 116. The optical filter 112 may further modify beam 110 from the modulator 104 and output a modified beam 118 toward the amplifier 106.

The apparatus 100 may also include an optical isolator 120, a beam delivery device 122, and a laser peening cell 124. The optical isolator 120 may pass a modified and amplified beam 126 from the amplifier 106 to the beam delivery device 122 which may deliver the modified and amplified beam 126 to a laser peening cell 124 containing a target part 101, or may deliver the modified and amplified beam 126 directly to the target part 101.

Figure 2:
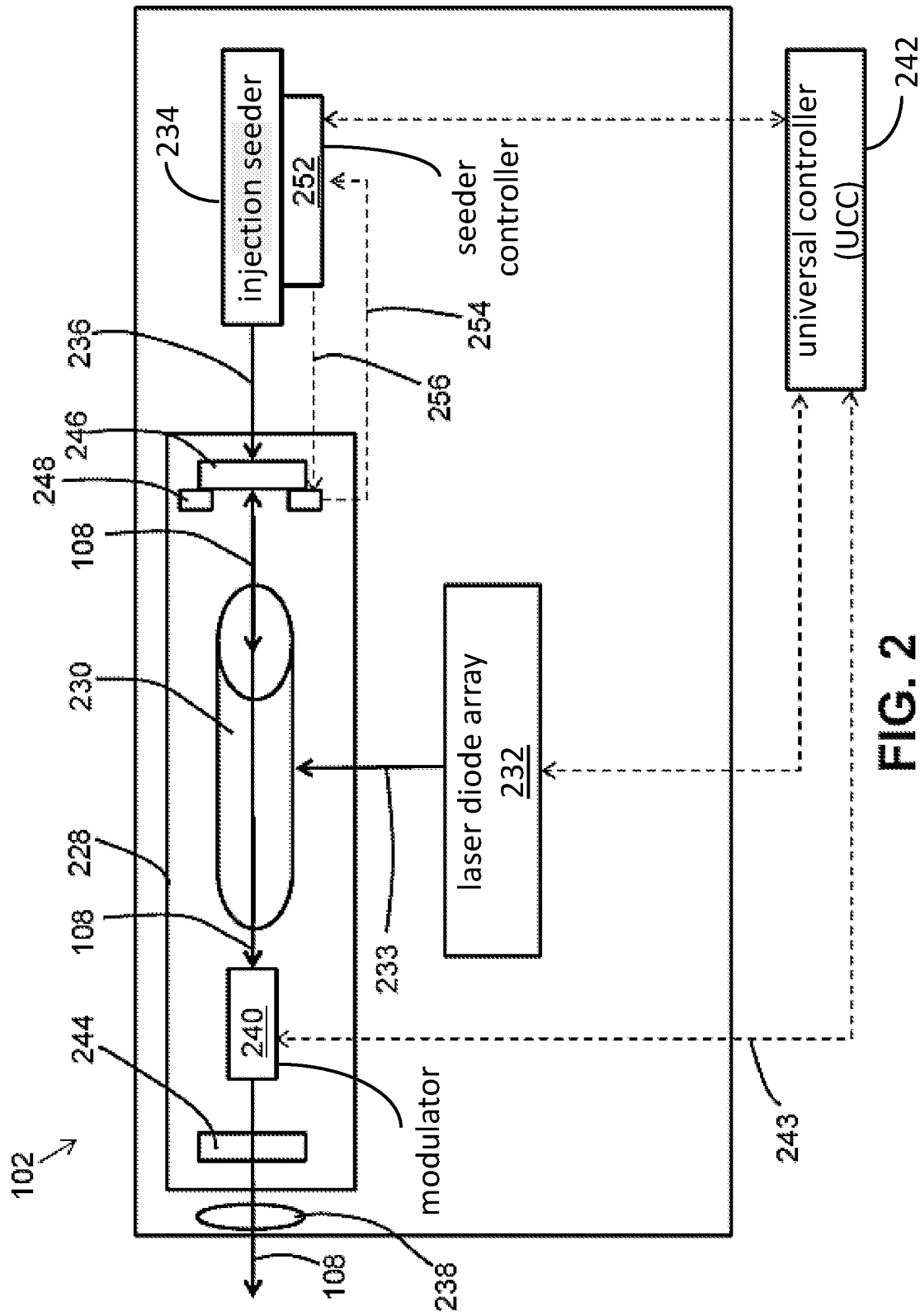
FIG. 2 is a schematic diagram of an example diode-pumped solid-state laser oscillator.

With reference to FIG. 2, a schematic of a DPSSL oscillator 102 is illustrated. The DPSSL oscillator 102 may include an optical cavity 228, a gain medium 230 within the optical cavity 228, and a laser diode array 232 to pump the gain medium 230 with light and energy 233 to produce a pulsed laser beam 108. The oscillator 102 may further include an injection seeder 234 configured to output a seed laser beam 236 into the cavity 228 to help stabilize the pulsed laser beam 108, and an iris/limiting aperture 238.

The gain medium 230 may be a 2 mm diameter (Nd:YLF) laser rod and may be a solid gain medium which may be optically pumped by one or more laser diodes (i.e., diode arrays) 232. The gain medium 230 may be of a single crystal or glass material and may be doped with trivalent rare earth ions or transitional metal ions. In one embodiment, the laser rod 230 used in oscillator 102 is doped with neodymium ($Nd^{3+}$). The gain medium 230 may be a synthetic yttrium aluminum garnet crystal ($Y_3Al_5O_{12}$) otherwise known as "YAG," doped with neodymium (Nd:YAG). In another embodiment, the gain medium 230 is a synthetic yttrium lithium fluoride ($YLiF_4$) crystal, or "YLF," doped with neodymium (Nd:YLF). The laser beam 108 produced by a (Nd:YLF) laser rod 230 may have a wavelength of 1053 nm. YLF crystals may produce a laser beam with a better beam quality, have a longer lifetime, and allow extraction of longer beam pulse widths, which may allow for a smaller design of the apparatus 100. Both YAG and YLF crystals may be grown using known processes, such as the Czochralski process. Crystals may be grown to various geometries and configurations so as to vary factors of the gain media, such as gain and energy storage.

The laser diode array 232 may pump the gain medium 230 with light energy 233 for amplification by the gain medium 230. In one embodiment, the laser diode array 232 includes an array of nine diode bars pumping the gain medium 230 to produce a 10 mJ laser output 108. As an example, the laser diode array 232 may have a QCW (quasi continuous wave) power output of about 6000 W, and operate at a current of about 15 A with an electrical-optical efficiency of about 57%. As an example, the diode array 232 may have an operating voltage of about 60 V. In one embodiment, the diode array 232 emits electromagnetic radiation at a wavelength of about 805.5±2 nm. In another embodiment, the diode array 232 emits electromagnetic radiation at a wavelength between about 750 nm to about 900 nm. A universal controller (UCC) 242 may be used to control the pumping of the gain medium 230 by the laser diodes 232. Specifically, the UCC 242 may control the timing of the laser diodes 232 so that the laser diodes 232 only pump the gain medium 230 as the beam 108 passes through the gain medium 230 to optimize the gain and amplification of the beam 108.

The oscillator 102 may further include a modulator 240 (i.e., a Q-switch) configured to produce a pulsed laser beam 108. In one embodiment, the Q-switch 240 is used to produce a laser beam 108 with a pulse width in the nanosecond range. The UCC 242 for the apparatus 100 may feed a trigger signal 243 to the Q-switch 240 to control the generation and a frequency of generation of the laser beam 108. In one embodiment, a repetition rate of about 20 Hz is used for pulse generation for LSP applications. In another embodiment, a repetition rate of between about 25 Hz and about 30 Hz is used for pulse generation. In another embodiment, a repetition rate of about 50 Hz or higher is used for pulse generation. The repetition rate may be varied and user-selected such that repetition rates slower than a 20 Hz base rate may be used. For example, repetition rates of 20 Hz, 19 Hz, 18 Hz, 17 Hz, 16 Hz, 15 Hz, 14 Hz, 13 Hz, 12 Hz, 11 Hz, 10 Hz, 9 Hz, 8 Hz, 7 Hz, 6 Hz, 5 Hz, 4 Hz, 3 Hz, 2 Hz, and 1 Hz are contemplated. For the Q-switched optical cavity 228 on the oscillator 102 as described herein, repetition rates of, for example, 20 Hz, 10 Hz, 6.67 Hz, 5 Hz, 4 Hz, 3.33 Hz, 2.857 Hz, 2.5 Hz, 2.22 Hz, 2 Hz, and 1 Hz are contemplated. These example frequencies are created by selecting every pulse to achieve a frequency of 20 Hz, selecting every second pulse to achieve a frequency of 10 Hz, selecting every third pulse to achieve a frequency of 6.67 Hz, and so on.

As shown in FIG. 2, the optical cavity 228 may further include a first mirror 244 and a second mirror 246. The mirrors 244 and 246 reflect the coherent light emitted by the gain medium 230 within the optical cavity 228 to amplify the beam 108 as the beam 108 is output from the oscillator 102. A piezo electric translator 248 is mounted to the second mirror 246.

The injection seeder 234 may be configured to output a seed laser beam 236 into the optical cavity 228 to help stabilize the beam 108. The injection seeder 234 may be a single longitudinal mode (SLM) fiber laser that injects a seed laser beam 236 into the optical cavity 228 to produce a beam 108 of a single longitudinal mode within the optical cavity 228.

The injection seeder 234 may include a seeder controller 252. The seeder controller 252 may interface with the UCC controller 242 of the apparatus 100 for controlling a seeder reset function. The seeder controller 252 may also be used to control the position of the PZT 248 so as to control a position of the second mirror 246. A feedback line 254 connects the PZT 248 to the seeder controller 252. An output line 256 connects the seeder controller 252 to the PZT 248.

In use, a seeder reset signal and a PZT control signal may be sent from the seeder controller 252 via the output line 256 to control a position of the PZT 248. The PZT 248 outputs a voltage to the feedback line 254 based on its position, which corresponds to both its current position and the current position of the second mirror 246. The seeder controller 252 may adjust a position of the second mirror 246 to control a phase shift of the beam 108 within the optical cavity 228 and maintain a desired phase of the beam 108 with respect to the single longitudinal mode (SLM). In other words, the seeder controller 252 may control a position of the PZT 248 and the second mirror 246 to maintain the beam 108 in an SLM.

The PZT 248 has a starting position. The starting position of the PZT 248 occurs during the startup of the apparatus 100 and after a seeder reset signal has been sent from the seeder controller 252 to the PZT 248. As the oscillator 102 produces and outputs the beam 108, the PZT continually adjusts and moves to new positions away from its starting position to maintain subsequent beams 108 in the SLM. The seeder controller 252 may store a reference voltage corresponding to a position of the PZT 248 that may produce an SLM beam 108. The reference voltage is compared to the voltage from the PZT 248 that corresponds to the current position of the PZT 248 relative to the starting position. If the difference in the compared values falls outside of a predetermined range, the seeder controller 252 may send PZT control signals via the output line 256 to adjust the position of the PZT 248 and the second mirror 246. In time, the PZT 248 will reach a movement limit, after which, the PZT 248 may no longer move to adjust the position of the second mirror 246. At this time, the seeder controller 252 performs a "seeder reset" to return the PZT 248 to its starting position. The seeder controller 252 sends a reset signal via the output line 256 to the PZT 248, and upon receiving the seeder reset signal, the PZT 248 moves from its current position to the starting position.

The seeder controller 252 may also be used to control when a reset of the PZT 248 is performed. One issue with seeders may be that a reset of the PZT 248 may occur automatically and could occur during full-system lasing. A seeder's manual controls may be modified and integrated into the seeder controller 252 and the UCC controller 242 in order to predict a need for seeder resets, and performs seeder resets at a time when it is appropriate to do so.

Figure 3:
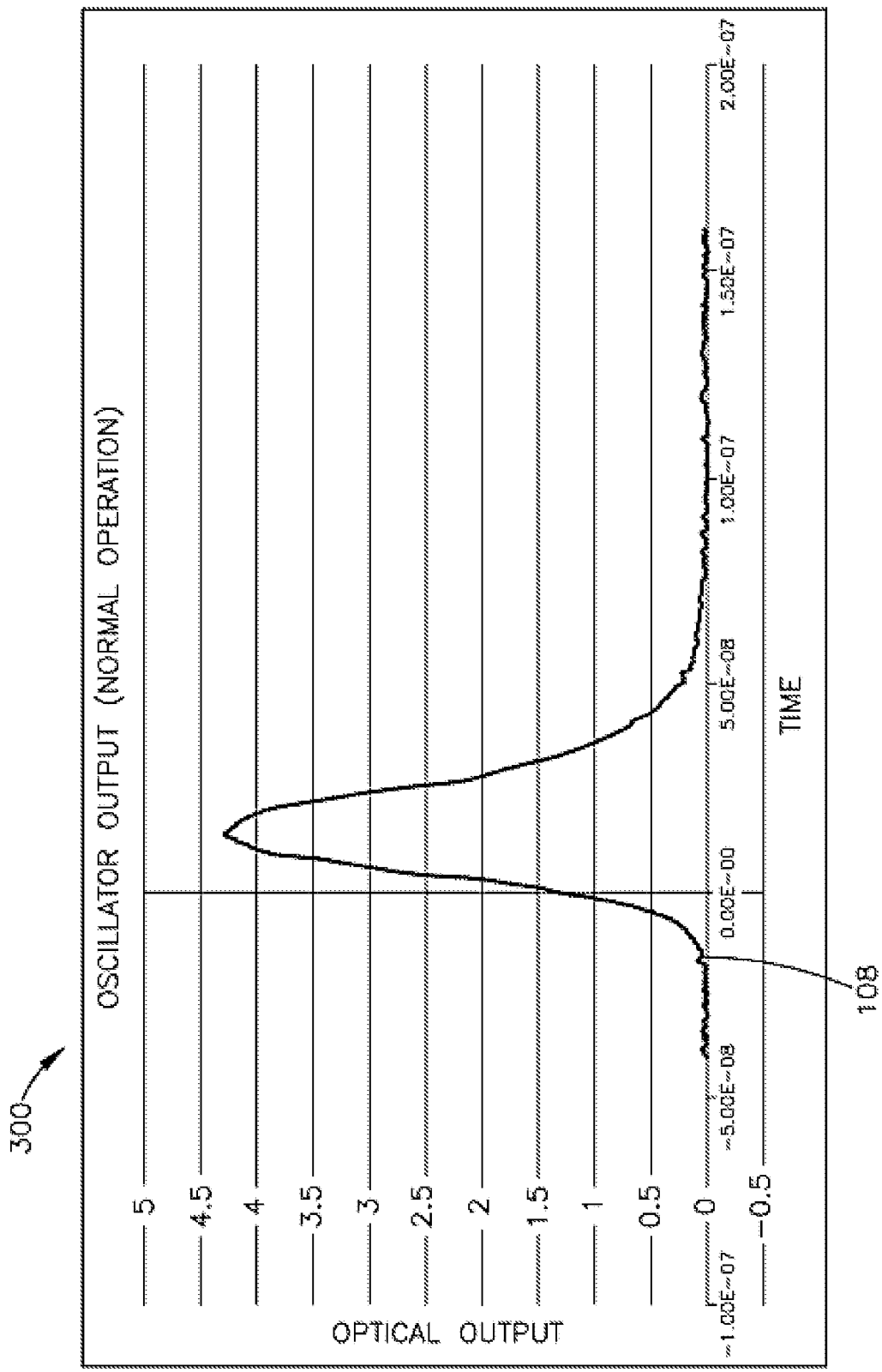
FIG. 3 is a graph of an example output of a DPSSL oscillator.

With reference to FIG. 3, an example graph 300 showing the temporal profile of the laser beam 108 as a normal output from a DPSSL oscillator is illustrated. The beam 108 may be output from the oscillator 102 between a seeder reset operation, with no substantial effect to the beam 108.

Figure 4:
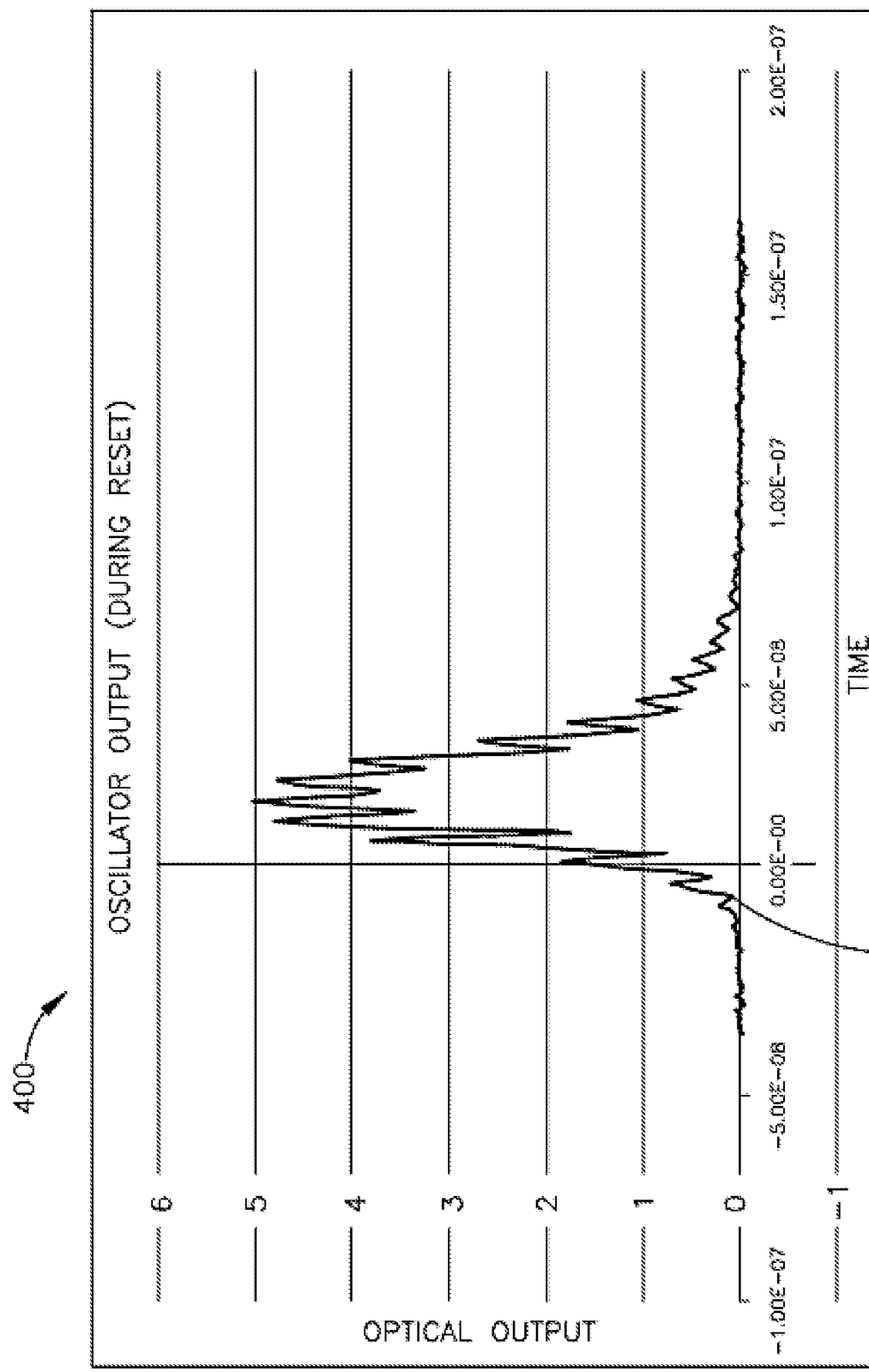
FIG. 4 is a graph of an example output of a DPSSL oscillator.

With reference to FIG. 4, an example graph 400 showing the temporal profile of the laser beam 108 output from the oscillator 102 during a seeder reset operation is illustrated. Graph 400 illustrates mode beating in the beam 108 output from the oscillator 102 caused by a seeder reset operation.

Figure 5:
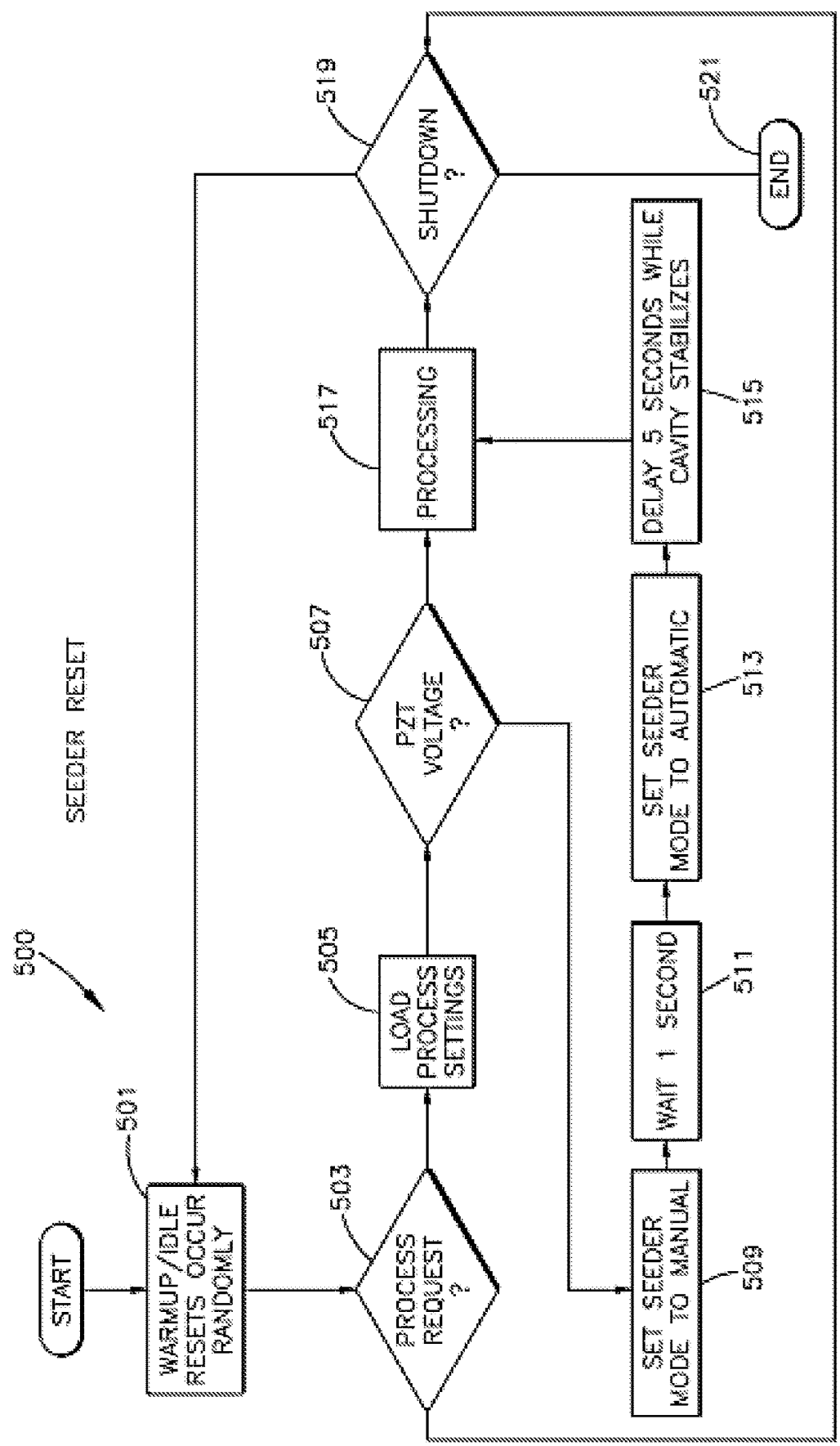
FIG. 5 is a flowchart of an injection seeder reset operation.

With reference to FIG. 5, a flowchart illustrating an example seeder reset method 500 provided by the seeder controller 252 is provided. At (501) the apparatus for use in laser shock peening 100, as shown in FIG. 1, is in a warmup or idle state, ready to output a laser beam for laser shock peening. During (501) the PZT 248, as shown in FIG. 2, will move the second mirror 246 to adjust the phase of the beam 108 within the oscillator 102. At (501) the beam 108 will be output from the oscillator 102, as shown in FIG. 1, but the beam 126 may not be output from apparatus 100.

At (503), a user or a user's programmed commands may instruct the UCC controller 242 (FIG. 2), to output a beam 126 from the apparatus 100 (FIG. 1). At (505), if a beam 126 is to be output from the apparatus 100, the process settings for the apparatus 100 are loaded so that the beam 126 may be output from the apparatus 100 according to the predetermined parameters, for example, energy, temporal profile, spatial profile, diameter, etc.

Based on the phase of the beam 108 at the second mirror 246 (FIG. 2), the seeder controller 252 may use the feedback line 250 at (507) to determine a voltage of the PZT 248 and compare the voltage against a reference voltage to determine a position of the PZT 248 within the optical cavity 228. As described above, the PZT 248 has a starting position—that is, an initial position of the PZT 248 at the startup of the apparatus 100. As the PZT 248 continues to move to adjust the second mirror 246 to adjust the phase of the beam 108 within the oscillator 102, the PZT 248 will eventually move to a position where it cannot move any more, and require a reset to move the PZT 248 back to the starting position.

If at (507) the feedback voltage is below a reference limit, a manual seeder reset may be initiated at (509). During a manual seeder reset, the beam 126 output from the apparatus 100 is suspended. A manual seeder reset at (509) adjusts the PZT 248 to the starting position. At (511), a 1 second delay is employed to wait for the PZT 248 to return to its starting position.

After the 1 second delay at (511) to allow the PZT 248 to return to the starting position, the seeder returns to automatic mode where the PZT 248 may move to adjust the second mirror 246 to adjust the phase of the beam 108 within the oscillator 102. A 5 second delay is employed after switching to automatic mode to allow the PZT 248 to adjust the second mirror 246 to a position to produce the desired phase for the beam 108. In one embodiment, the automatic mode delay may be less than 5 seconds.

From (509) to (515), the output of the beam 126 from the apparatus 100 (FIG. 1) is suspended, and the UCC controller 242 (FIG. 2) may adjust components in the apparatus 100 to prevent the output of the beam 126. For example, the UCC controller 242 may control the switching of the slicer 104 (FIG. 1) to prevent the beam 108 from being output to other components in the apparatus 100 to prevent the output of the beam 126 from the apparatus 100. The UCC controller 242 may also adjust the timing of the amplifier 106 (FIG. 1) to prevent any laser energy leaking from the slicer 104 from being output from the apparatus 100 as the beam 126.

After the delay at (515), processing resumes at (517) to output the beam 126 from the apparatus 100. If the voltage of the PZT 248 is above the limit based on the feedback reference voltage 250 at (507), processing continues at (517) to output the beam 126 from the apparatus 100.

After processing and outputting the beam 126 (FIG. 1) at (517), the UCC controller 242 queries whether to shutdown the apparatus 100 at (519). If the UCC controller 242 determines that the apparatus 100 be shut down at (519), the apparatus 100 is shut down and operations end at (521). If the UCC controller 242 determines that the apparatus 100 should not be shut down at (519), the method 500 returns to (501). Should the UCC 242 determine that the apparatus 100 will not output a beam 126 at (503), the UCC 242 is queried whether to shutdown the apparatus 100 at (519), as described above.

The seeder reset method 500 may be adapted to reset a seeder on a laser system/apparatus having a flashlamp-pumped oscillator.

As shown in FIG. 2, the oscillator 102 may further include an iris/limiting aperture 238. The iris 238 may include an aperture opening to pass the laser beam 108 before it is output from oscillator 102. The size of the aperture on the iris 238 may regulate the amount of the beam 108 output from the oscillator 102. Passing the beam 108 through the iris 238 is used to produce a beam in the $TEM_{00}$ single transverse mode.

As used herein, a "single transverse mode" (STM) means the oscillator 102 is operating on a single transverse resonator mode, generally a Gaussian mode, such that the quality of laser beam 108 is diffraction-limited such that the beam 108 may be focused to a very small spot. Here, the transverse resonator mode would be transverse electromagnetic mode (TEM) mode, such that there is neither a magnetic field, nor an electric filed in a direction of beam propagation. A "single longitudinal mode" (SLM) means a longitudinal beam of a single frequency and a single wavelength. A major source of noise in laser systems may be fluctuations of a pump source 232, changes in length of the optical cavity 228, or alignment of the optical cavity 228. Limiting the beam 108 output from oscillator 102 to STM and SLM may eliminate noise in the beam 108. Thus, the oscillator 102 may be operable to output a pulsed laser beam 108 in both an STM and SLM.

Beam uniformity is a beam-profile measurement and represents the normalized RMS (root mean square) deviation of the energy density from its average, over the central 90% or more of the beam 108. Data outside of the central 90% is not included in the RMS calculation. In one embodiment, the beam uniformity for the pulsed laser beam 108 output from the oscillator 102 is less than about 0.2.

Beam quality is given by an $M^2$ value and referred to as a beam quality factor. The $M^2$ value is used to quantify a degree of variation between an actual beam 108 and an ideal beam. For a single transverse mode, $TEM_{00}$ Gaussian laser beam, $M^2$ is exactly 1.0. In one embodiment, the oscillator 102 outputs a beam 108 with a $M^2$ value of about 1.2 or less. In another embodiment, the oscillator 102 outputs a beam 108 with a $M^2$ value of less than about 1.3. In another embodiment, the oscillator 102 outputs a beam 108 with a $M^2$ value of less than about 1.5. An SLM beam 108 may have a spectral width of about 1 pm. The modifier "substantial" is used at various times herein. Whether explicit or otherwise, the terms "single transverse mode" and "single longitudinal mode" should be read as "substantially single transverse mode" and "substantially single longitudinal mode," with reference to the $M^2$ description. Such a deviation from the ideal will be readily understandable to persons having ordinary skill in the art.

In addition to an output beam in STM and in SLM, the pulsed laser beam 108 output from the oscillator 102 may have a first energy of about 10 mJ to about 20 mJ, have a first beam diameter up to about 4 mm in diameter, have a first temporal profile (e.g., Gaussian-shaped), and have a first spatial profile (e.g., Gaussian-shaped).

With reference to FIG. 1, the modulator 104 may receive the pulsed laser beam 108 from the oscillator 102. The modulator 104 may be a pulse slicer used to sharpen either or both of the leading edge and the tailing edge of the pulsed laser beam 108 to modify the temporal profile of the pulsed laser beam 108, and output a modified beam 110 with a second energy, a first diameter, a second temporal profile, and a first spatial profile.

In one embodiment, the pulse slicer 104 is an SBS cell used to vary a temporal profile of the laser beam 108. In another embodiment, the pulse slicer 104 is a Pockels cell used to vary a temporal profile of the laser beam 108.

The modulator 104 may include a crystal material such as barium borate (BBO) or potassium dideuterium phosphate (KD*P) through which the pulsed laser beam 108 passes. In one embodiment, the pulse slicer 104 includes a BBO material to provide faster pulse slicing of the beam 108. In one embodiment, the pulse slicer 104 modifies a leading edge of the laser pulse 108. In another embodiment, the pulse slicer 104 modifies both a leading edge and a tailing edge of the laser pulse 108. The pulsed laser beam 108 may be sliced and output as modified beam 110 with a rise time of less than about 5 ns. In one embodiment, rise time of the modified beam 110 is less than 3 ns. In another embodiment, the rise time of the modified beam 110 is less than about 2 ns. In one embodiment, the pulse width of the beam 108 is adjusted to between about 5 ns and 16 ns for output as the modified beam 110. In another embodiment, the pulse width of the beam 108 is adjusted to between about 8 ns and 16 ns for output as the modified beam 110. In another embodiment, the pulse width of the modified beam 110 is less than or equal to about 5 ns. A short rise time provides a laser beam that produces better laser shock peening results.

Figure 6:
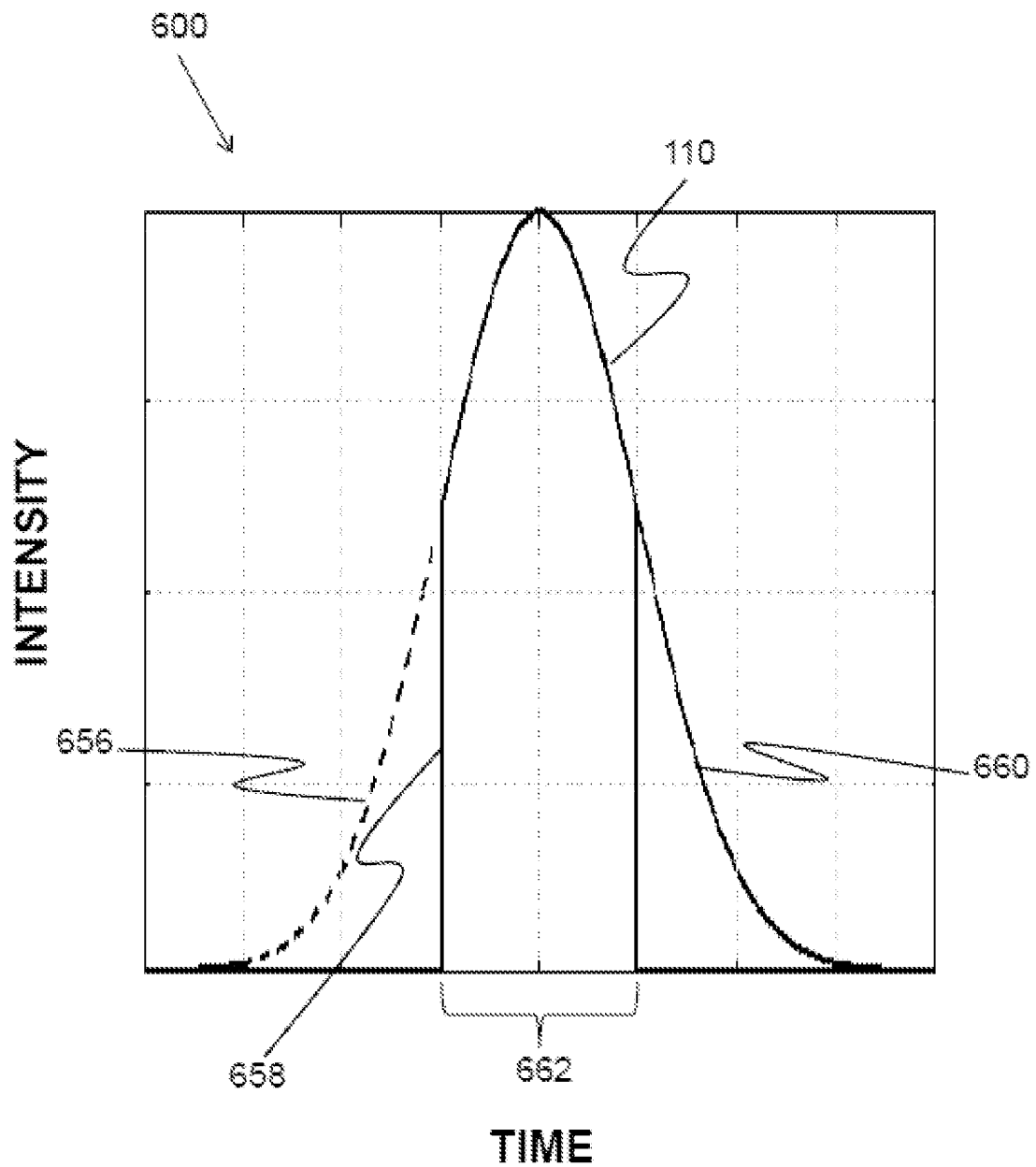
FIG. 6 is a graph of an example temporal modification to a laser beam.

With reference to FIG. 6, a temporal profile 600 of the example modified beam 110 is illustrated. As described above, a temporal profile of the pulsed laser beam 108 from oscillator 102 may be substantially Gaussian in appearance, as illustrated. As the beam 108 is modified to the beam 110 by the modulator 104, the leading edge 656 may be sliced off by the modulator 104 to create a sharper leading edge 658 of the laser pulse. The sharp leading edge 658 of the laser pulse may provide a faster rise time for the modified beam 110. The trailing edge 660 of the laser pulse may also be sliced off by the modulator 104 to vary a pulse width 662 of the modified beam 110.

With reference to FIG. 1, the modified beam 110 may be output from the modulator 104 and pass through the optical isolator 114. In one embodiment, the optical isolator 114 is a Faraday isolator that transmits the modified beam 110 in a forward direction while blocking light in opposite directions, for example, reflected laser energy from optical surfaces of components in the apparatus 100 or from the target part 101. The optical isolator 114 may be used to protect the oscillator 102 and the modulator 104 from interactions of the modified beam 110 with other components in the apparatus 100, to limit and prevent back reflections—that is, prevent and limit light reflected from the other components from passing backward through the optical isolator 114 and damaging the oscillator 102 and the modulator 104. In one embodiment, the Faraday isolator 114 is configured to pass a modified beam 110 having a beam diameter of up to about 4 mm.

The waveplate 116 may be, for example, a half-wave plate (λ/2 plate) used to rotate the polarization of linearly polarized laser pulses, for example, the modified laser pulse 110. As a laser pulse interacts with optical components of the apparatus 100, the polarization state of the laser pulse may change. The waveplate 116 may be used to fine tune the apparatus 100 by rotating the polarization of the laser beam for optimum energy transmission of the pulse through the apparatus 100. Additional waveplates may be added to the apparatus 100 to optimize the transmission of a laser pulse through the optical components in the apparatus 100. Additional waveplates may be the same as the waveplate 116 shown in FIG. 1, or alternatively, they may be different. For example, such a different waveplate may be a quarter-waveplate (λ/4 plate).

The optical filter 112 may receive the modified beam 110 from the waveplate 116, further modify the beam 110 from having a second energy, a second temporal profile and a first spatial profile, to a modified beam 118 having a second energy, a second temporal profile, and a second spatial profile, and output the modified beam 118.

Figure 7:
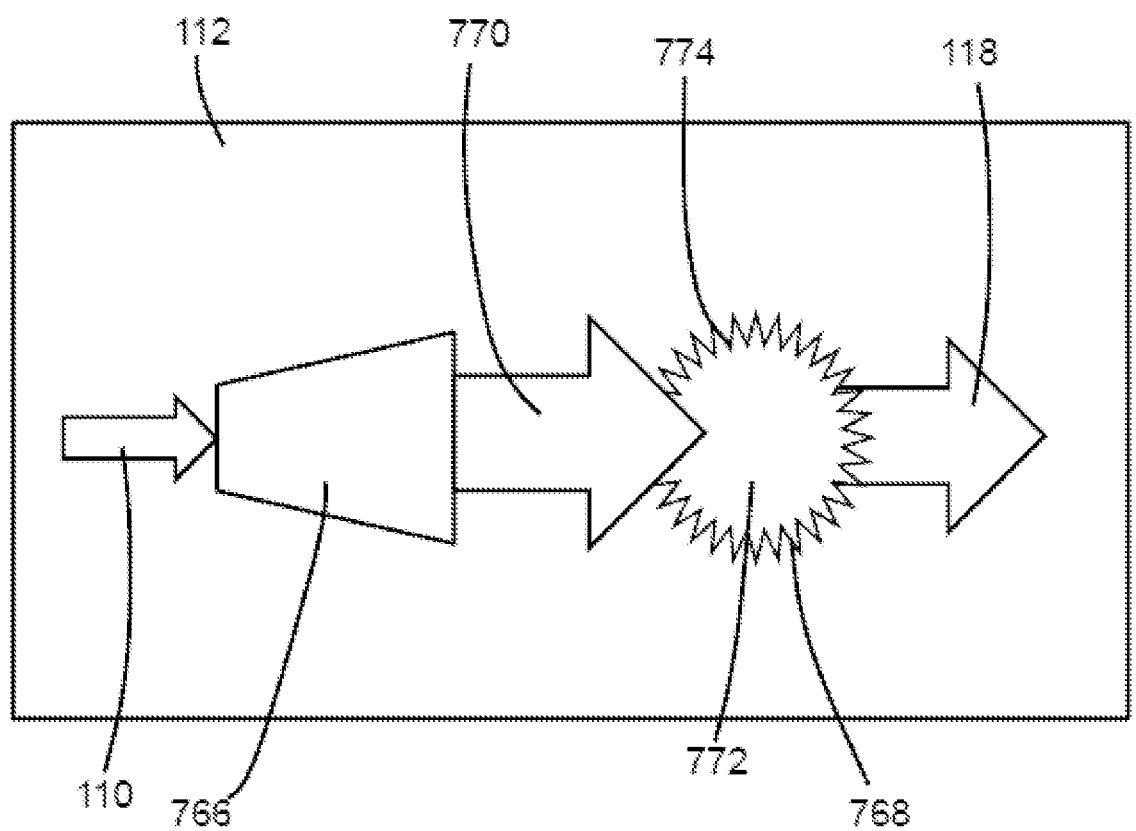
FIG. 7 is a schematic diagram of an example optical filter.

With reference to FIG. 7, a schematic diagram of an example optical filter 118 is illustrated, and may include a beam expander 766 and a beam shaping element 768. The beam expander 766 may be used to increase a diameter of the modified beam 110 greater than the first diameter of the beam produced by the oscillator. By increasing the diameter of the modified beam 110 with the beam expander 766, the expanded modified beam 770 may overfill an aperture 772 on the beam shaping element 768. In one embodiment, the beam shaping element 768 is an apodizer. An apodizer 768 may include an aperture 772 with a grit blasted or serrated edge 774. By expanding the modified beam 110 with the beam expander 766 and overfilling the apodizer 768 with the expanded modified beam 770, wing portions of the expanded modified beam 770 may be removed to modify the beam 110 with the first spatial profile to the beam 118 having a second spatial profile with a more flat-top, top-hat shaped appearance. Other beam shaping devices may be used for beam shaping element 768. In one embodiment, a pi shaper (πShaper®), manufactured by AdlOptica Optical Systems GmbH of Berlin, Germany, is used as the beam shaping element 768 to produce a flat-top (or pi-shaped) beam 118.

Figure 8:
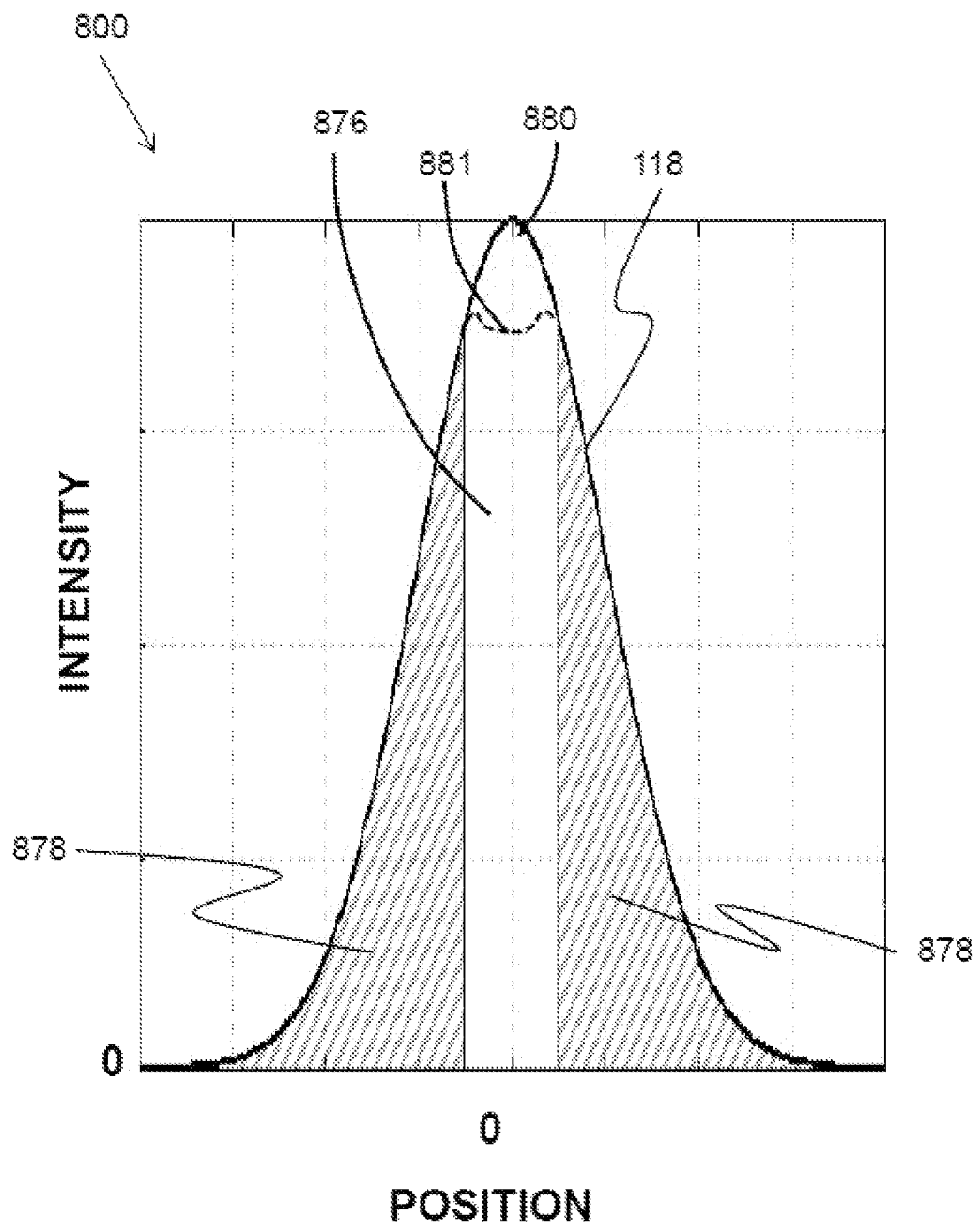
FIG. 8 is a graph of an example spatial modification to a laser beam.

With reference to FIG. 8, an example spatial profile 800 of the modified laser beam 118 is illustrated. Both the pulsed laser beam 108 and the modified beam 110 shown in FIG. 1 may have a first spatial profile that appears substantially Gaussian, for example, as illustrated in FIG. 8. A beam shaping element may be used to create a substantially top-hat shaped, flat-top beam from the beam center portion 876. After removing the wing sections 878, the rounded portion 880 of the substantially top-hat shaped, flat-top beam may continue to flatten, as approximated by the dashed line 881, as the modified beam 118 with the flat-top center portion 876 passes through an amplifier.

With reference to FIG. 1, the modified beam 118 having a second energy, a second temporal profile, and a second spatial profile may be output from the optical filter 112 and input into the amplifier 106 for amplification of the modified beam 118. The amplifier 106 may output a modified and amplified beam 126. In one embodiment, the laser pulse 108 output from the oscillator 102 has a first energy, a first beam diameter, a first temporal profile, and a first spatial profile, while the modified and amplified beam 126 output from the amplifier 106 has an energy greater than the first energy, a beam diameter greater than the first beam diameter, a temporal profile different than the first temporal profile, and a spatial profile different than the first spatial profile.

Figure 9:
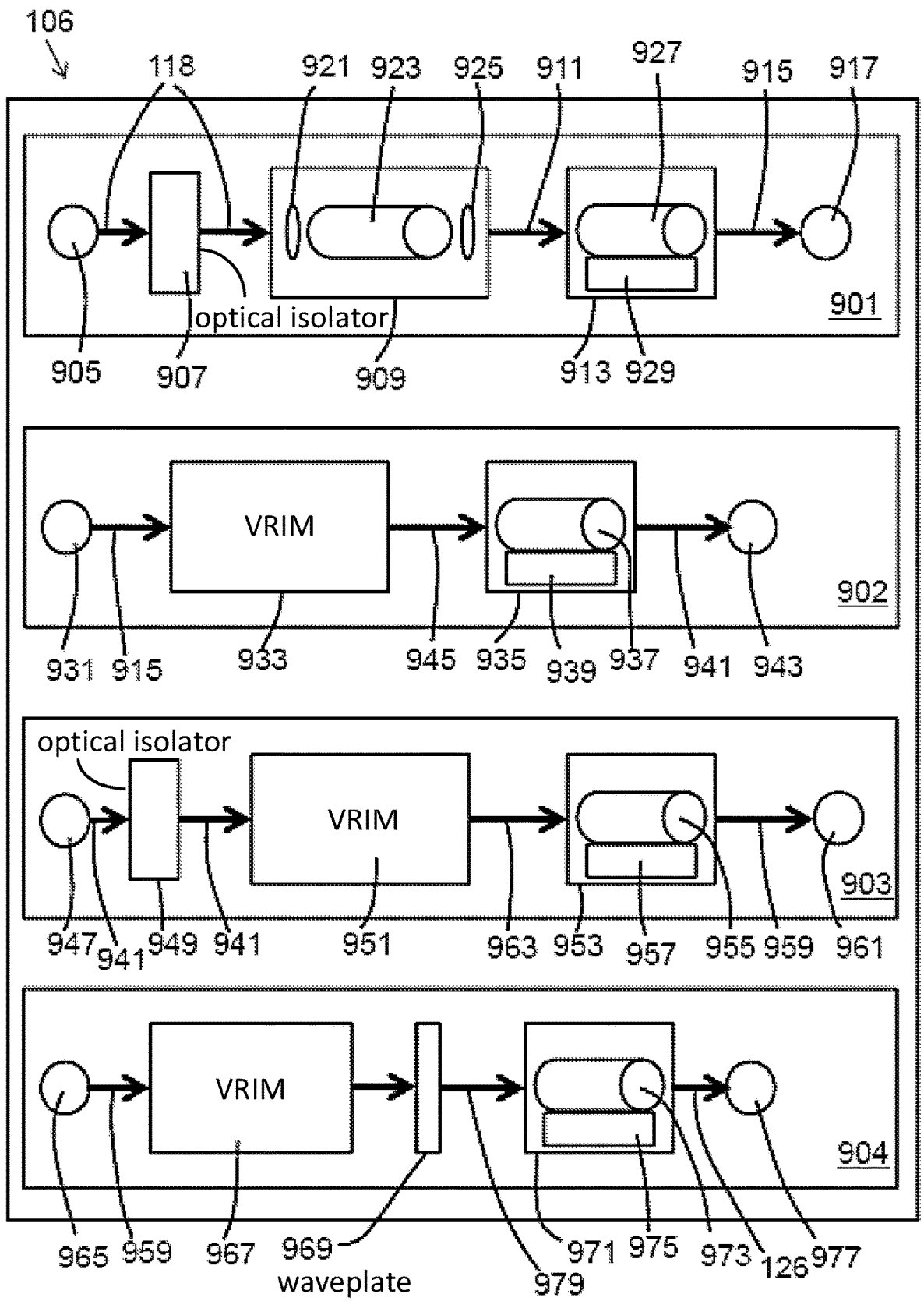
FIG. 9 is a schematic diagram of an example amplifier.

With reference to FIG. 9, an example multi-stage amplifier 106 is illustrated. As illustrated in FIG. 9, the amplifier 106 has four amplification stages 901, 902, 903, and 904. As shown here, the modified beam 118 may enter the first amplifier stage 901, and a modified and amplified beam 126 may be output from the fourth amplifier stage 904.

The modified beam 118 may be input into the input 905 on the first amplifier stage 901, and passed through the optical isolator 907. From the optical isolator 907, the modified beam 118 may pass further through a vacuum relay imaging module (VRIM) 909 that focuses the modified beam 118, and then recollimates the beam 118 to an increased diameter, before outputting a collimated beam 911 to an amplifier module 913. The amplifier module 913 may amplify the collimated beam 911 and output an amplified beam 915 to a first amplifier stage output 917.

An optical isolator 907 may function similarly to the optical isolator 114 described above. The optical isolator 907 may be a Faraday isolator that transmits the modified beam 118 in a forward direction of travel while blocking backscattered light and other backward directed energy from the beam 118. In one embodiment, the optical isolator 907 is used to protect the previously described components of the apparatus 100 from backward directed energy from the beam 118 after the beam 118 passes through the optical isolator 907. The optical isolator 907 may provide for a passage of the modified beam 118 with a beam diameter of up to about 8 mm.

The modified beam 118 may pass through the isolator 907 and be input into the vacuum relay imaging module (VRIM) 909. The VRIM 909 may focus and recollimate the modified beam 118, and output the collimated beam 911. The VRIM 909 may include a first lens 921, a vacuum tube 923, and a second lens 925. The modified beam 118 enters the VRIM 909 and passes through the first lens 921 which passes the modified beam 118 through focus near the center of the inside of the vacuum tube 923. As the modified beam 118 exits the vacuum tube 923, the beam 118 is recollimated by the second lens 925. The collimated beam 911 is output from the VRIM 909 with a decreased beam intensity and a beam diameter greater than the first beam diameter of the pulsed laser beam 118. The VRIM 909 relays the modified beam 118 into a larger diameter collimated beam 911. The vacuum tube 923 is used to prevent the air breakdown of the modified beam 118 at the point of focus. The air breakdown of the beam 118 would result in a loss of beam quality and beam energy.

The VRIM 909 may preserve a spatial profile of the modified beam 118, while increasing the size of the modified beam 118 to optimally fill the gain medium 927 of the amplifier module 913. Optimally filling the gain medium 927 optimizes the amplification of the collimated beam 911 by the amplifier module 913.

The beam 911 enters into the gain medium 927 of the amplifier module 913. The amplifier module 913 includes the gain medium 927 and a pump source 929. The pump source optically pumps the beam 911 as it passes through the gain medium 927. The gain medium 927 may be a Nd:YLF crystal laser rod pumped by a laser diode array 929. As the beam 911 passes through the rod 927, the beam 911 is amplified and is output as an amplified beam 915. In one embodiment, the laser rod 927 is about 5 mm in diameter. In another embodiment, the laser rod 927 is about 4-6 mm in diameter. In another embodiment, the laser rod 927 is about 3-7 mm in diameter. The gain medium 927 may have a fill factor of about 80%—that is, about 80% of the gain medium area will be filled by the beam 911. Generally, a gain medium with a larger fill factor will have a higher gain, and more energy stored within the gain medium may be extracted. In one embodiment, the rod 927 has a fill factor of 85%.

The first amplifier stage 901 with the amplifier module 913 may serve as a small preamplifier to amplify the energy of a beam input at the input 905 and output the amplified beam 915 at the output 917. In the given example, the amplified beam 915 may have a third energy of about 40 mJ to 100 mJ, a second beam diameter of about 4.5 mm, a third temporal profile, and a third spatial profile.

The amplified beam 915 may be input into an input 931 on the second amplifier stage 902. The second amplifier stage 902 may be similar to the first amplifier stage 901 and include a VRIM 933, and an amplifier module 935 having a gain medium 937, and a pump source 939. An amplified beam 941 may be output from the amplifier module 935 to a second amplifier stage output 943.

The VRIM 933 may be similar in operation to the VRIM 909 and include lenses and a vacuum tube to focus the amplified beam 915, recollimate the beam 915, and output a collimated beam 945. The VRIM 933 prevents the breakdown of the amplified beam 915, and increases a diameter of the amplified beam 915 to increase the fill factor of the collimated beam 945 on the gain medium 937. Lenses of the VRIM 933 may be of a larger diameter than the lenses 921 and 923 in the VRIM 909 (i.e., a beam with a higher energy and larger beam diameter, for example the amplified beam 915, may utilize larger diameter lenses), and the lengths of a vacuum tube in the VRIM 933 may be longer than the tube 923 in the VRIM 909. Generally, the lens size for a VRIM and a length of a vacuum tube in a VRIM increase with an increase in the beam energy and beam diameter. The VRIM 933 may relay image the amplified beam 915 into the collimated beam 945 with a diameter to provide the gain medium 937 with a fill factor of about 80% to 85%.

The amplifier module 935, similar to the amplifier module 913 described above, may include a gain medium 937 and a pump source 939. The beam 945 may pass through the gain medium 937 as the gain medium 937 is pumped by pump source 939, so as to amplify the beam 945, before the beam 945 is output from the amplifier module 935 as the amplified beam 941. The gain medium 937 may be a Nd:YLF crystal laser rod pumped by a laser diode array 939. In one embodiment, the laser rod 937 is about 9 mm in diameter. In another embodiment, the laser rod 937 is about 8-10 mm in diameter. In another embodiment, the laser rod 937 is about 7-11 mm in diameter. The second amplifier stage 902 with the amplifier module 935 may serve as a small preamplifier to amplify the energy of a beam input at the input 931 and output the amplified beam 941 at the output 943. In the given example, the amplified beam 941 may have a fourth energy of about 1 J, a third beam diameter of about 8.1 mm, a fourth temporal profile, and a fourth spatial profile.

As shown in FIG. 9, the amplifier stages 901 and 902 may operate in the small signal gain regime, which may further sharpen the leading edge of the temporal profile of a beam through gain sharpening. The pulse width of the beam may also narrow as the beam passes through these amplifier stages.

The amplified beam 941 may be input into an input 947 on the third amplifier stage 903. The third amplifier stage 903 may be similar to the previous amplifier stages 901 and 902 and include an optical isolator 949, a VRIM 951, and amplifier module 953 having a gain medium 955, and a pump source 957. An amplified beam 959 may be output from the amplifier module 953 to a third amplifier stage output 961.

The optical isolator 949 may be similar in operation to the optical isolator 907 described above. In one embodiment, the optical isolator 949 is configured to provide passage for the amplified beam 941 having a diameter up to about 12 mm.

The VRIM 951 may be similar in operation to the VRIMs 909 and 933 described above, including lenses and a vacuum tube to focus the amplified beam 941, recollimate the amplified beam 941, and output a collimated beam 963. The VRIM 951 prevents a breakdown of the amplified beam 941 after the amplified beam 941 is focused, and recollimates the beam 941 to increase the diameter of the amplified beam 941 to increase the fill factor of the collimated beam 963 on the gain medium 955. The lenses of the VRIM 951 may be of a larger diameter than the lenses in the VRIMs 909 and 933, and the length of the vacuum tube in VRIM 951 may be longer than the vacuum tubes in the VRIMs 909 and 933. The VRIM 951 may relay image the amplified beam 941 into the collimated beam 963 with a diameter to provide the gain medium 955 with a fill factor of about 80% to 85%.

The amplifier module 953, similar to the amplifier modules 913 and 935 described above, may include a gain medium 955 and a pump source 957. The collimated beam 963 may pass through the gain medium 955 as the gain medium 955 is pumped by the pump source 957 to amplify the beam 963, before the beam 963 is output from the amplifier module 953 as the amplified beam 959. The gain medium 955 may be a Nd:YLF crystal laser rod pumped by a laser diode array 957. In one embodiment, the laser rod 955 is about 15 mm in diameter. In another embodiment, the laser rod 955 is about 14-18 mm in diameter. In another embodiment, the laser rod 955 is about 12-18 mm in diameter. The third amplifier stage 903 with the amplifier module 953 may serve as a small amplifier to amplify an energy of a beam input at the input 947 and output the amplified beam 959 at the output 961. In the given example, the amplified beam 959 may have a fifth energy of about 4.3 J, a fourth beam diameter of about 13.5 mm, a fifth temporal profile, and a fifth spatial profile.

The amplified beam 959 may be input into an input 965 on the fourth amplifier stage 904. The fourth amplifier stage 904 may be similar to the previous amplifier stages 901, 902, and 903, and include a VRIM 967, a waveplate 969, and an amplifier module 971 having a gain medium 973 and a pump source 975. An amplified beam 126 may be output from the amplifier module 971 to a fourth amplifier stage output 977.

The VRIM 967 may be similar in operation to the VRIMs 909, 933, and 951 described above, including lenses and a vacuum tube to focus the amplified beam 959, recollimate the amplified beam 959, and output a collimated beam 979. The VRIM 967 prevents the breakdown of the amplified beam 959, and recollimates the amplified beam 959 to increase the diameter of the amplified beam 959, so as to increase the fill factor of the output beam 979 on the gain medium 973. The lenses of the VRIM 967 may be of a larger diameter than lenses in the VRIMs 909, 933, and 951, and the length of the vacuum tube in VRIM 967 may be longer than the tubes in the VRIMs 909, 933, and 951. The VRIM 967 may relay image the amplified beam 959 into the collimated beam 979 with a diameter to provide the gain medium 973 with a fill factor of about 80% to 85%.

The amplifier module 971, similar to the amplifier modules 913, 935, and 953 described above, may include a gain medium 973 and a pump source 975. The collimated beam 979 may pass through the gain medium 973 as the gain medium 973 is pumped by the pump source 975 to amplify the beam 979, which is output from the amplifier module 971 as the amplified beam 126. The gain medium 973 may be a Nd:YLF crystal laser rod pumped by a laser diode array 975. In one embodiment, the laser rod 973 is about 25 mm in diameter. The fourth amplifier stage 904 with the amplifier module 971 may serve as an amplifier to amplify an energy of a beam input at the input 965 and output the amplified beam 126 at the output 977. In one embodiment, the fourth amplifier stage 904 includes one amplifier module 971. In another embodiment, the fourth amplifier stage 904 includes one or more amplifier modules 971. In the given example, the amplified beam 126 may have a sixth energy of about 7 J to 13 J, a fifth beam diameter of about 20 mm to 25 mm, a sixth temporal profile, and a sixth spatial profile. The amplified beam 126 output from the amplifier 106 may be a modified and amplified beam.

Characteristics of a beam moving through the amplifier 106 may change due to the amplification of the beam. For example, as a beam is amplified, the beam diameter may be increased by the optical elements in the amplifier 106 to more efficiently fill each gain medium (e.g, laser rod), which may provide the most optimally amplified laser output from the gain media, while also fully utilizing the capabilities of certain components within the amplifier 106.

The beam diameter may increase as a beam passes through the amplifier 106 so as to match a gain medium size (e.g., rod diameter), for example, the rods 927, 937, 955, and 973 used in the respective amplifier stages 901, 902, 903, and 904. As the beam energy is increased throughout the amplifier 106, a risk of damage to the optical components within the amplifier 106 increases if the beam diameter remains too small. The power density on the gain media may be kept below the damage thresholds by increasing the beam size as the beam energy increases.

Other characteristics of beam moving through the amplifier 106 may change due to the amplification of the beam. For example, the leading edge of a beam's temporal profile may be sharpened as a beam is amplified.

As shown in FIG. 2, the UCC controller 242 may be used to control the timing of amplifier modules 913, 935, 953, and 971, as shown in FIG. 9. Specifically, the UCC controller 242 may control when the pump source in an amplifier module pumps the gain medium in the amplifier module to optimize the amplification of a beam passing through the gain medium. In this way, the amplification of a beam passing through an amplifier module may be controlled.

With reference to FIG. 1, an optical isolator 120 may be used after the beam 126 is output from the amplifier 106 to prevent the beam 126 from interacting with the prior optical components of the apparatus 100 once the beam 126 passes through the optical isolator 120. For example, once the beam 126 passes through the optical isolator 120, the optical isolator 120 prevents backscattered light from the beam 126 from interacting with any of the prior optical components from the oscillator 102 to the amplifier 106 in the apparatus 100. In one embodiment, the optical isolator 120 is a Faraday isolator and may allow the passage of the beam 126 having a diameter up to about 35 mm.

Additional elements may be used with the apparatus 100 to deliver a modified and amplified laser beam 126 to the target part 101 for laser shock peening (LSP) applications. The beam 126 may pass through the optical isolator 120 and to the beam delivery device 122 for delivery to a target part 101 alone, or a target part 101 contained in the peening cell 124.

Figure 10:
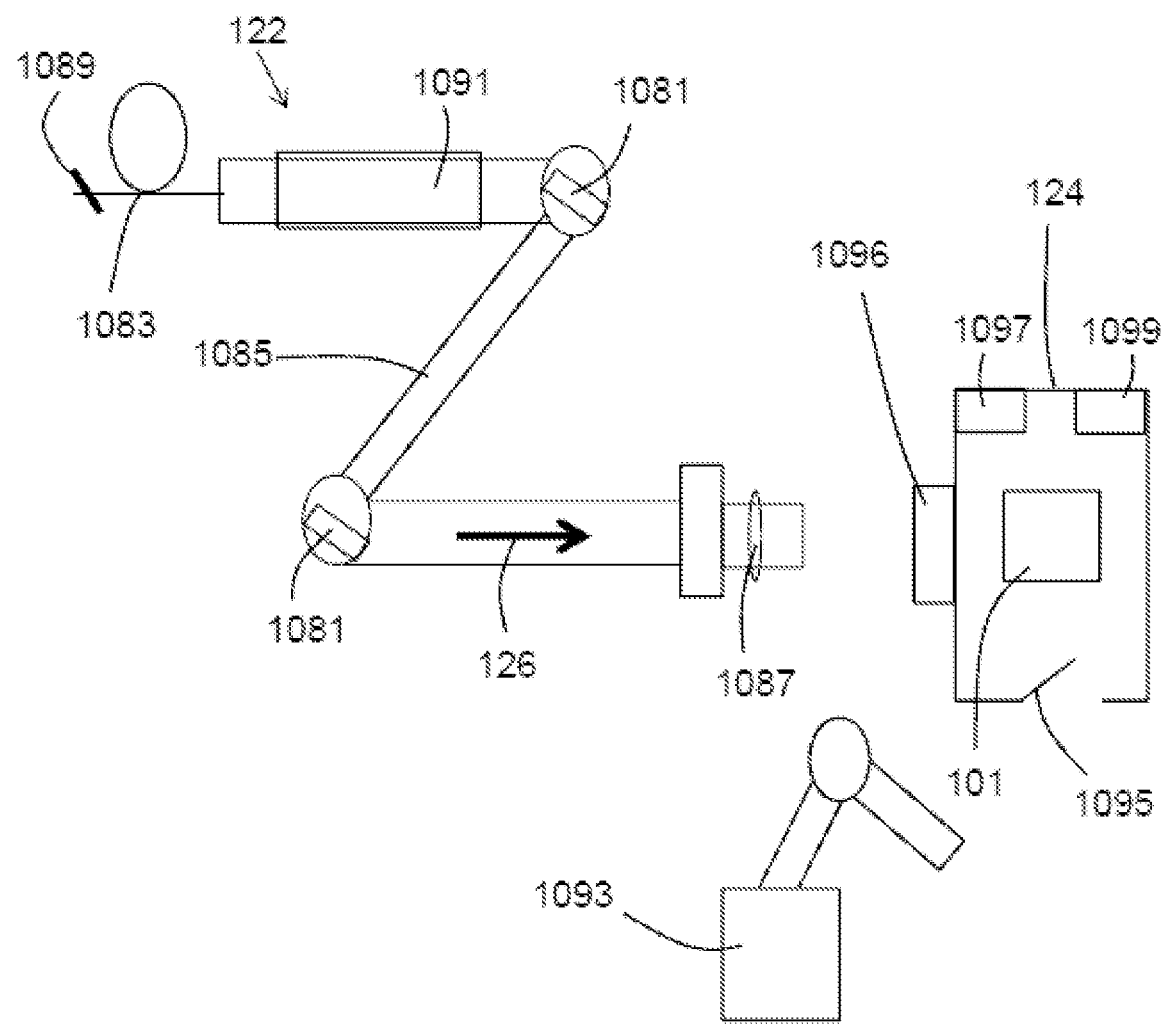
FIG. 10 is a schematic diagram of an example laser delivery device and peening cell.

As illustrated in FIG. 10, the laser beam delivery device 122 may include one or more mirrors 1081, one or more optical cables 1083, and a multi-axis articulating arm 1085. A laser beam delivery device 122 may include focusing optics 1087 to focus a larger sized beam 126 into a smaller spot size of about 2-3 mm for use in LSP applications. In one embodiment, a focusing optic 1087 of laser beam delivery device 122 focuses and adjusts a spot size of the beam 126 to between about 3 mm and 8 mm. The laser beam delivery device 122 may also include additional safety features such as a shutter 1089 to block the beam 126 from entering the laser beam delivery device 122, unless the delivery device 122 is positioned to deliver the beam 126 to the target part 101 or peening cell 124. Additional VRIM assemblies 1091 may be used with the laser beam delivery device 122 to maintain near filed values and measurements of the modified and amplified beam 126 output from the amplifier 106. In one embodiment, a VRIM 1091 is used to relay image the beam 126 to the target part 101.

The laser peening cell 124 may contain the target part 101 to be laser shock peened. A robotic handling 1093 system may be adapted to manipulate the laser beam delivery device 122 to change the position of the laser beam delivery device, and thus the position of the beam 126 output from the delivery device 122 to the target part 101. A robotic handling 1093 system may also be used to introduce parts to and from the laser peening cell 124. The laser peening cell 124 may provide a light-tight environment to confine dangerous laser light from the beam 126 within the laser peening cell 124. The laser peening cell 124 may be equipped with additional options like lighting, an air filtration system, and evacuation system for removing effluent and debris produced during LSP processing, and an interface 1095 (i.e., entry/exit) for a robot 1093 to move parts into and out of the laser peening cell 124, as well as other safety systems. In one embodiment, the laser peening cell 124 may be sized at dimensions of about 4.5 m×4.5 m×3.0 m (height) to allow a robot 1093 to manipulate larger target parts therein. A laser peening cell 124 may include a target isolation system 1096, for example, an optical isolator, to prevent laser energy backscattered from the target part 101 from entering into the delivery device 122 or other optical elements of the apparatus. In one embodiment, the laser peening cell 124 may include an opaque overlay applicator 1097 to apply an opaque overlay to the target part 101, and a transparent overlay applicator 1099 to apply a transparent overlay to the target part 101. An opaque overlay and a transparent overlay may be applied to the target part 101 such that the amplified and modified beam 126 contacts the opaque and transparent overlays on the target part 101 during the LSP process.

In one embodiment, the near-field values of the modified and amplified beam 126 include an energy of about 7 to 13 J, a pulse width of up to about 16 ns, an average power of 200 W, and a spot size of at least 3 mm. In this embodiment, the modified and amplified beam 126 with these parameters is produced by the apparatus 100 at a repetition rate of 20 Hz.

In another embodiment, the near-field values of the modified and amplified beam 126 include an energy of about 5 J to about 10 J, and average power of about 5 W to about 200 W, a beam uniformity of less than about 0.2 (20%), and a beam focused to a spot size of about 3 mm to about 8 mm. In this embodiment, the oscillator 102 of the apparatus 100 may produce a beam with a beam quality of less than about 1.3 M² out of the oscillator, and a beam having these parameters and the initial beam quality may be produced with a variable repetition rate between about 1 Hz and 20 Hz, for example, optionally variable "on the fly," depending on a surface of the target part 101.

In another embodiment, a working distance of about 5-10 m between the final focusing optic 1087 and the target part 101 is possible. A large working distance may adequately distance the optical components of the apparatus 100 from debris and effluent produced during the LSP processes.

Figure 11:
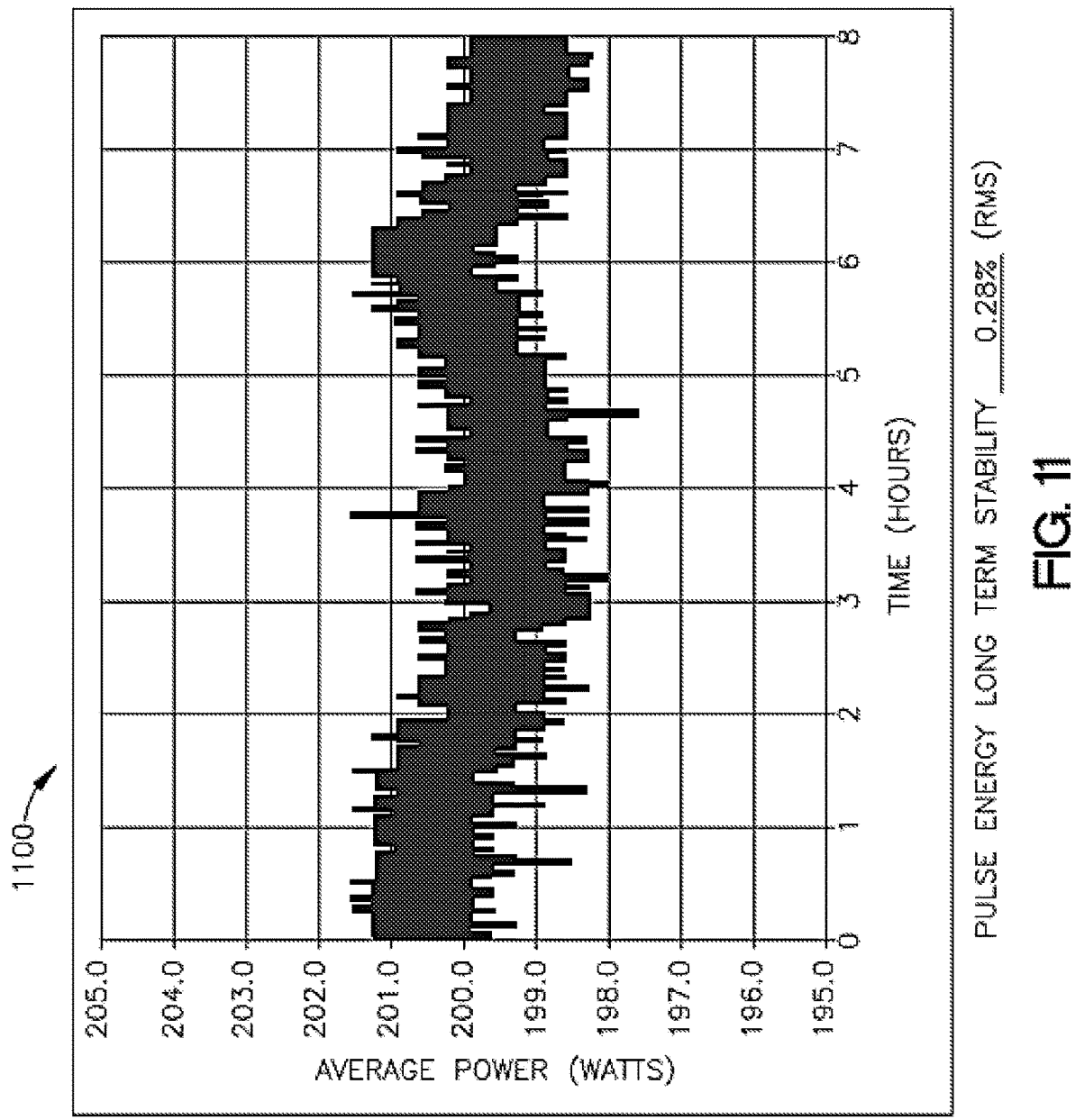
FIG. 11 is a graph of an example output from an LSP apparatus.

With reference to FIG. 11, a graph showing power/pulse energy long term drift is illustrated in 1100. Graph 1100 shows an average pulse power of the modified and amplified beam after 8 hours of continuous operation and shows an average power of around 200 W, with a pulse energy long-term stability of about 0.28% (rms).

Figure 12:
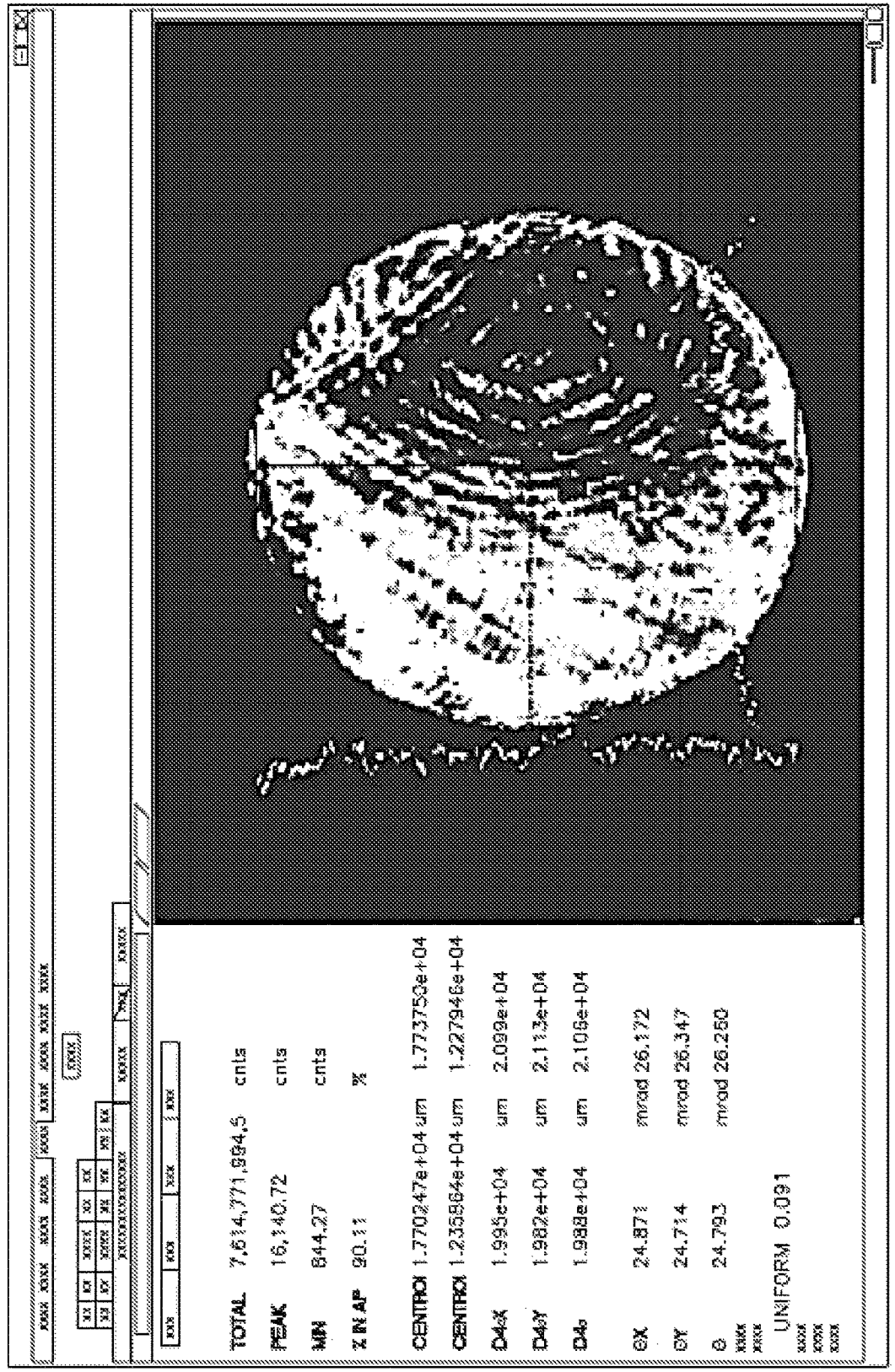
FIG. 12 is a graph of an example output from an LSP apparatus.

With reference to FIG. 12, a graph showing spatial beam fluence uniformity is illustrated in 1200. The spatial beam fluence uniformity may be captured by aiming the modified and amplified beam at a camera configured to profile the beam. The camera may include an aperture, and the beam fluence uniformity may be quantified within the aperture as defined by profiler software. The beam energy within this defined aperture will be greater or equal to about 90% of the total pulse energy, with the beam uniformity defined as the normalized rms deviation of the power/energy density from its average value within the defined aperture. Profiler software may be used to measure spatial beam uniformity. For example, a Spiricon® camera with Spiricon® BeamGage® software produced by Ophir-Spiricon, Inc. of North Logan, Utah may be used to measure and output the beam fluence uniformity as illustrated in 1200. Like colors in graph 1200 illustrate an ability of the modified and amplified beam to maintain a spatial beam fluence uniformity, while color variance illustrates hot spots within the modified and amplified beam. As shown in graph 1200, the beam fluence uniformity is 9.10%.

Figure 13:
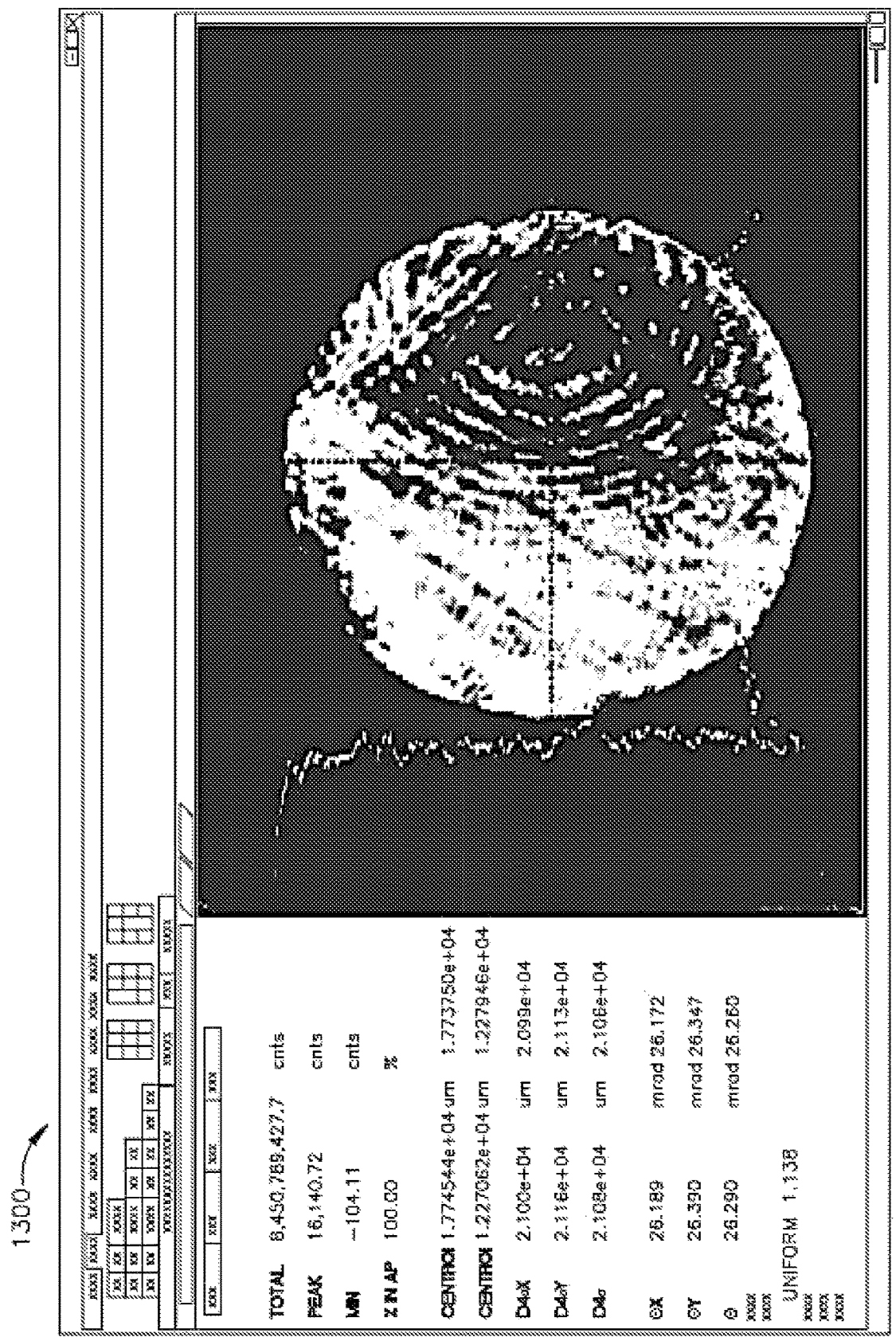
FIG. 13 is a graph of an example output from an LSP apparatus.

With reference to FIG. 13, a graph 1300 showing the near field beam profile of the modified and amplified beam is illustrated. As shown in graph 1300, the near field beam profile shows a beam diameter of about 21 mm—more specifically, ranging from 21.06 mm to 21.793 mm depending on the measurement and calculation techniques.

Figure 14:
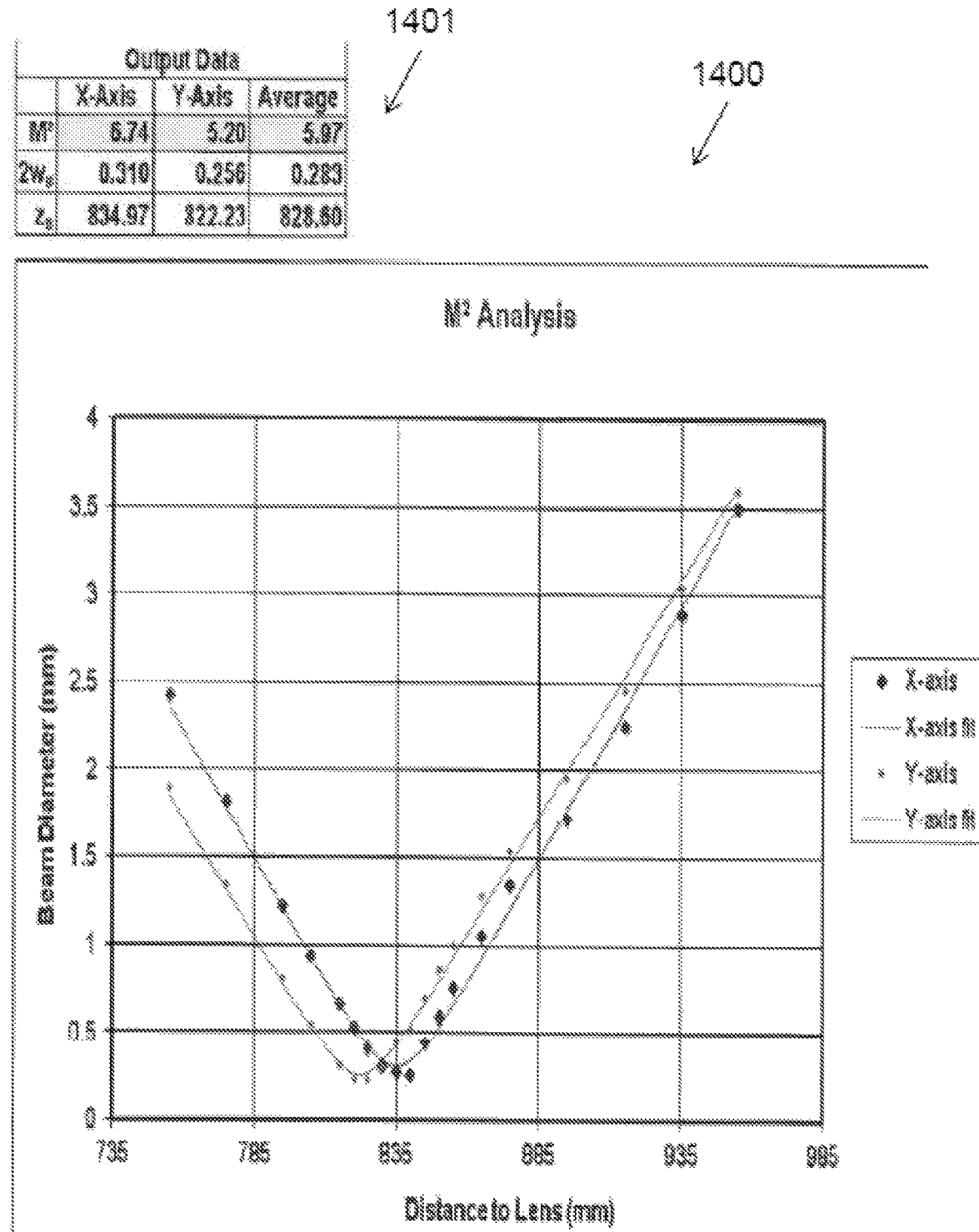
FIG. 14 is a graph of an example output from an LSP apparatus.

With reference to FIG. 14, a graph 1400 showing an M² analysis that is, a beam quality analysis in the near field for the output beam 126 (FIG. 1), is illustrated. The M² value, also known as the beam quality factor, is given by Formula 1:

$$M^2 = (d_1 * \pi * D_0)/(4 * \lambda * f) \quad \text{Formula 1}$$

where $d_1$ is the minimum waist of the beam ($2\omega_0$ in the table)—that is, 0.310 mm; where $D_0$ is the size of the beam entering the lens—in this case, 20 mm; where $\lambda$ is the wavelength of the laser—in this case, 1053 nm; and where f is the lens focal length—in this case, 800 mm. As shown in the table 1401, the near field beam quality has an average value of about 5.97.

Figure 15:
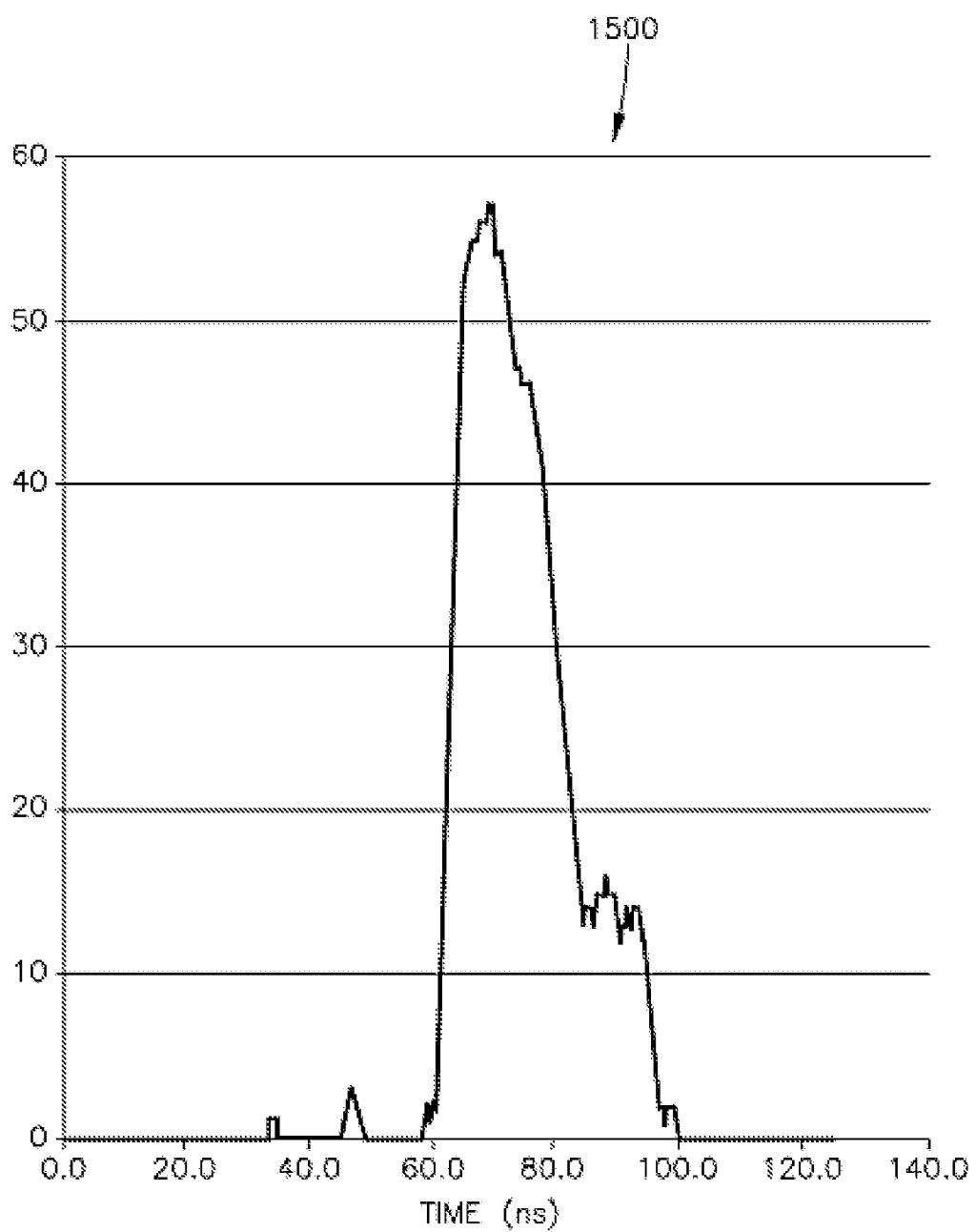
FIG. 15 is a graph of an example output from an LSP apparatus.

As shown in FIG. 15, graph 1500 shows a temporal profile of a beam with a leading edge sliced off by a modulator 104 (FIG. 1). The graph of the beam was produced by directing a portion of a beam to a photodiode which measures the energy of the beam in terms of voltage. The voltage is sent to an oscilloscope for data collection. As shown in FIG. 15, the y axis represents a digitized raw data point from the oscilloscope. The oscilloscope captures the data as an 8-bit sample to provide 127 discrete positive values. Table 1 shows times and associated values for values captured between 0 and the peak value of 58 on the leading edge of the beam shown in FIG. 15.

TABLE 1

Values of beam leading edge versus time

| Time (ns) | Value |
|---|---|
| 58.3 | 0 |
| 59.5 | 1 |
| 60.7 | 3 |
| 61.2 | 6 |
| 61.9 | 12 |
| 63.1 | 32 |
| 64.3 | 49 |
| 64.7 | 52 |
| 65.5 | 54 |
| 66.7 | 55 |
| 67.9 | 57 |
| 69.1 | 58 |

Rise time can be calculated as the time between about 10% and 90% of the peak value. In the given example, for the peak value of 58, a rise time is calculated between values of about 6 and 52. Based on the values in the table above, the rise time for the leading edge of the beam shown in FIG. 15 is about 3.5 ns.

Referring now to FIG. 16, a flow chart of an example method 1600 for laser peening a target part is provided. The method includes: producing and outputting a pulsed laser beam having a first energy, a first beam diameter, and a first temporal profile from an oscillator having a diode-pumped laser rod (1601). The beam output by the oscillator is received at a pulse slicer (1603) that modifies the beam having a first energy and a first temporal profile to a second energy and a second temporal profile (1605). The pulse slicer outputs the modified beam having the second energy and the second temporal profile from the pulse slicer to an amplifier (1607). The amplifier receives and amplifies the modified beam with the amplifier from the second energy to a third energy with a second beam diameter greater than the first beam diameter (1609) and a third temporal profile different than the second temporal profile, and outputs the beam having the third energy, the second beam diameter, the third temporal profile from the amplifier to the target part for laser shock peening the target part (1611).

The oscillator as described in method 1600 may further output a beam with a first spatial profile, and include receiving the modified beam having the second energy, the second temporal profile, and the first spatial profile at an optical filter; and modifying the modified beam with the optical filter to output a modified beam with the second energy, the second temporal profile, and a second spatial profile.

The amplifier as described in method 1600 may further output a beam having a spot size and include: receiving the beam output from the amplifier at a laser beam delivery device; focusing the beam with the laser beam delivery device to a spot size of about 3 mm to about 8 mm; and outputting the beam to the target part.

The third energy as described in method 1600 may be from about 5 J to about 10 J. The second beam diameter as described in method 1600 may be from about 22 mm to about 22.5 mm. The third temporal profile described in method 1600 may include an average pulse width of about 12 ns.

Figure 17:
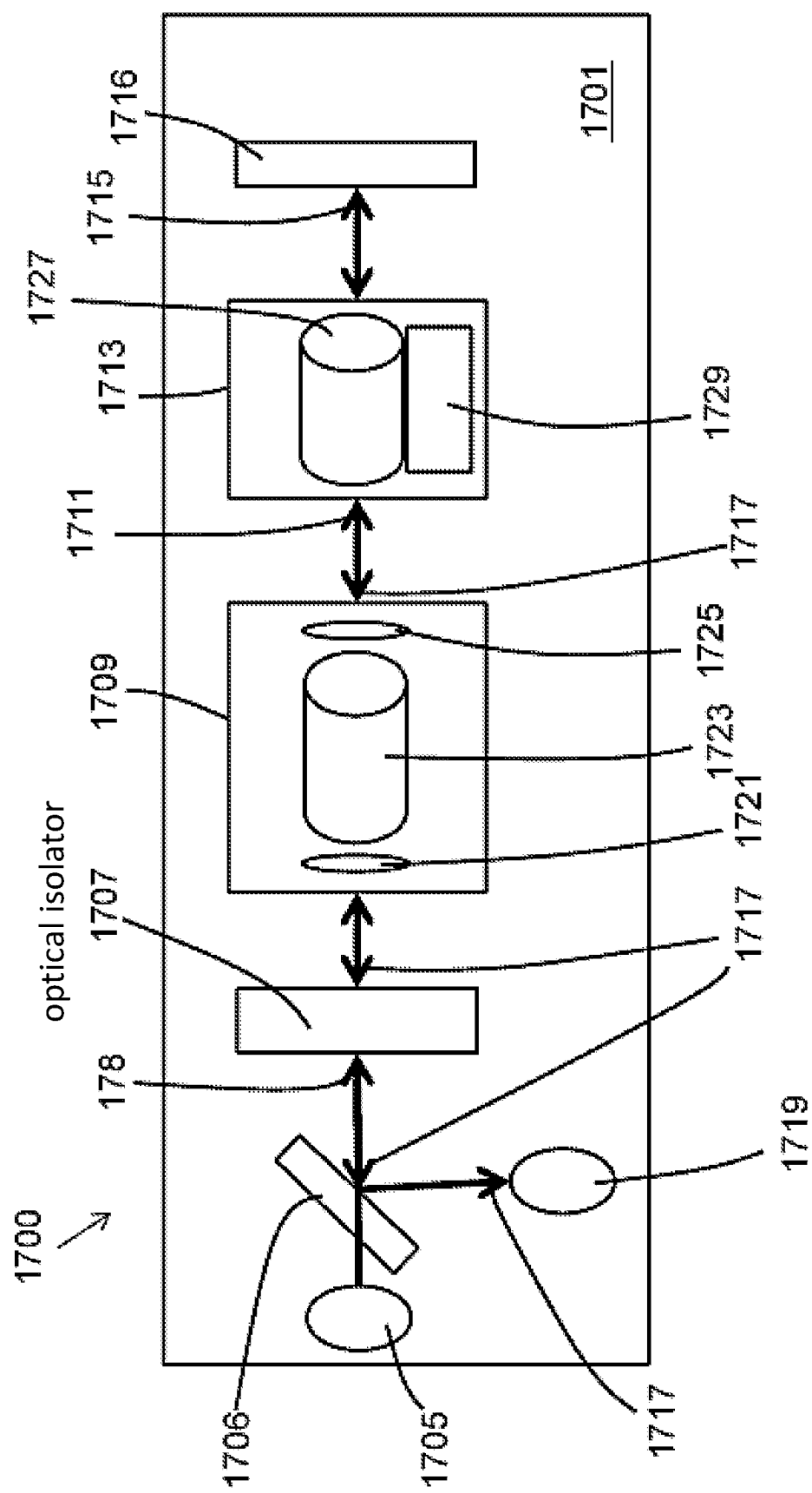
FIG. 17 is a schematic diagram of an example amplifier stage.

With reference to FIG. 17, an example double-pass first amplification stage 1701 for the amplifier 106 is illustrated.

The first amplification stage 1701 may be arranged to receive a modified laser beam 178 at an input 1705, pass the modified beam through a polarizer 1706, an optical isolator 1707, and a VRIM 1709 to output a beam 1711 with a larger diameter. The larger beam 1711 may be further passed through a laser amplifier module 1713, and output from the amplifier module 1713 as an amplified beam 1715. The amplified beam 1715 may be reflected off a mirror 1716 and passed back through the amplifier module 1713 to produce a double-passed amplified beam 1717 that may be passed back through the VRIM 1709 and the optical isolator 1707 and reflected from the polarizer 1706 to an output 1719.

Similar to first amplifier stage 901 described above, double-pass first amplifier stage 1701 may receive a modified beam 178 at the input 1705, and pass the modified beam 178 through the polarizer 1706. The polarizer 1706 may change a polarization of the beam 178 and direct the beam 178 toward the optical isolator 1707. The optical isolator 1707 may work similarly to the optical isolator 907 described above. Changing a polarization of the beam 178 may allow the double-passed amplified beam 1717 to pass back through the optical isolator 1707 in a direction different than the direction of the beam 178.

The VIRM 1609 may include a first lens 1721, a vacuum tube 1723, and a second lens 1725 and operate similarly to the VRIM 909 described above to output a larger beam 1711. Additionally, the VRIM 1709 may allow the double-passed amplified beam 1717 output from the amplified module 1713 to pass through the VRIM 1709 in a direction of travel different than the direction of the beam 1711.

The amplifier module 1713 may be similar to the amplifier module 913 described above, and may include a gain medium 1727 and a pump source 1729. The beam 1711 may pass through the gain medium 1727 as the gain medium 1727 is pumped by the pump source 1729 to amplify the beam 1711, before the beam 1711 is output from the amplifier module 1713 as the amplified beam 1715. The gain medium 1727 may be a Nd:YLF crystal laser rod pumped by a laser diode array 1729. The rod 1727 may further amplify a reflected, amplified beam 1715 passing back through the rod 1727, before the amplified beam 1715 is output from the rod 1727 and the amplifier module 1713 as the double-passed amplified beam 1717.

The mirror 1716 may reflect the amplified beam 1715 back through the first amplifier module 1713 to further amplify the beam 1715 and output the double-passed amplified beam 1717.

After the double-passed amplified beam 1717 passes through both the VRIM 1709 and the optical isolator 1707, the double passed beam 1717 contacts the polarizer 1706 which may change a polarization of the double-passed amplified beam 1717, and direct the beam 1717 toward the output 1719 of the double-pass first amplifier stage 1701.

The double-pass first amplifier stage 1701 with the amplifier module 1713 may act as a small preamplifier to amplify an energy of a beam input at the input 1705 and output the double-passed and amplified beam 1717 at the output 1719. In the given example, the double-passed amplified beam 1717 may have a third energy of about 230 mJ, a second beam diameter of about 4.5 mm, a third temporal profile, and a third spatial profile.

As shown in FIG. 9, the additional amplifier stages, such as 902, 903, and 904 may be set up to be double-passed with similar components as described above for the double-passed first amplifier stage 1701. An additional dual double-pass amplification arrangement may be used whereby a pulse is first double-passed through one amplifier module, and then double-passed through a subsequent amplifier module with a gain medium having of greater diameter than the previous amplifier module.

Figure 18:
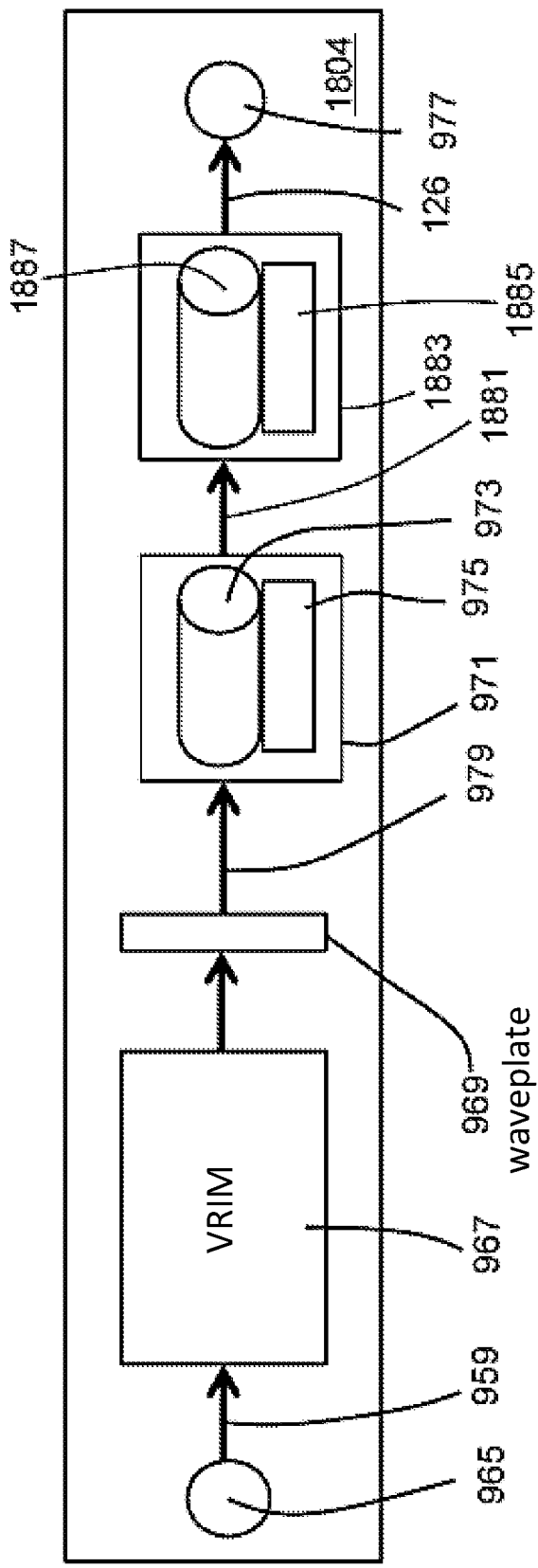
FIG. 18 is a schematic diagram of an example amplifier stage.

As shown in FIG. 18, an example fourth amplification stage 1804 with a matched amplifier module 1883 may be used to increase the amplification of the beam 1881 exiting the amplifier module 971. The matched fourth amplification stage 1804 may be similar to the amplification stage 904 described above, with additional amplifier modules. The amplifier module 1883 may be similar to the amplifier module 971—that is, the gain medium 1887 of the amplifier module 1883 may be the same size as the gain medium 973 of the amplifier module 971. The amplifier module 1883 has a pump source 1885 to pump the gain medium 1887 to amplify the input beam 1881, before outputting an output beam 126 at the output 977. Any amplifier stage of the apparatus 100 may be arranged to be matched that is, an amplifier stage may include additional amplifier modules to amplify a beam and be configured similarly to what is shown in FIG. 18.

Figure 19:
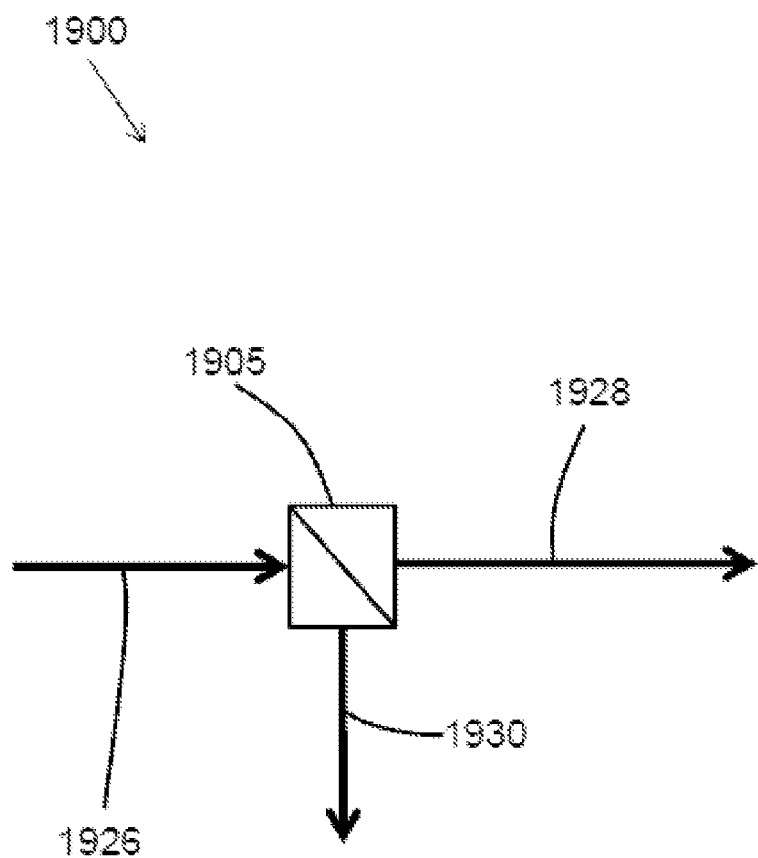
FIG. 19 is a schematic diagram of an example beam splitter configuration.

With reference to FIG. 19, a schematic view of an example beam splitter configuration 1900 is illustrated. Beam splitter configuration 1900 may be used, for example, after a final amplifier stage to split a beam into two beams of equal or non-equal energy. Beam splitter configuration 1900 may include a beam splitter 1905 to split a modified and amplified beam 1926 into beams 1928 and 1930. Additional amplification configurations, such as a double-pass configuration, a matched configuration, or other configuration may be used to amplify split beams.

Embodiments described herein may use robotic controls, control systems, and instruction sets stored on a computer readable medium, that when executed, may perform exampled methods described herein. For example, a robot may be used for manipulating a target part and directing a pulsed laser beam to different locations on a target part. A robot may be used to move target parts in and out of a laser peening cell for LSP. A robot may move parts in batches for efficient LSP processing. Robots may interface with a control system to manipulate parts for LSP processes that is, a robot may control positioning of a part such that a part may be positioned to receive both a transparent overlay, and a laser pulse for LSP. A robot arm may reposition the same part for subsequent LSP targets on the part. In one embodiment, a robot repositions a part for subsequent LSP targets at a rate of about 20 Hz. In another embodiment, a robot has a position repeatability accuracy of less than about 0.2 mm. Additionally, a robot may be used to interact with a tool or sensor to generate feedback for a system adjustment or calibration. As shown in FIG. 10, a robot such as a robotic arm 1093 may be equipped with the components of the beam delivery device 122, such that the robot 1093 and the beam delivery device 122 may be repositioned relative to a stationary part 101, to deliver a laser pulse to the target part 101 for laser shock peening. In this way, a robot may either control the position of the target part 101 relative to the output beam 126, or control the position of the output beam 126 relative to the target part 101.

An apparatus for use in LSP processes may interface with one or more controllers for controlling functions of the apparatus. Controllers may either automatically make calibrations or adjustments, or there may be a user interface for a user to interface with the control of the apparatus. For automatic control, various sensors may be employed to collect various beam parameters as beams progress through the apparatus. Sensor readings may either be collected in real time, or collected at intervals and used as feedback for apparatus control. For example, temperature measurements may be taken within the apparatus at regular intervals to ensure that the apparatus is working within specified temperature ranges. A pulse energy, pulse width, and spatial profile of one or more pulses may be measured and monitored, and when measured values fall outside of a user-selected range, a control system may adjust components of the apparatus so that measured values may fall within a user-selected range.

Data related to laser beam parameters may be taken from inside the apparatus, and from a beam delivery path (e.g. as a fraction reflection from an optical component or leakage of energy through a mirror). Data may be taken periodically and cross-calibrated to target data to ensure that LSP process conditions are within user-selected tolerances.

Beam position and spot sized may be determined with a camera positioned in the beam path with very tight tolerances. A camera may be used to capture a beam image, and parameters extracted from a beam image may be compared with ideal parameters. For example, if a beam position is not centered as indicated by an ideal position parameter, a mirror may be automatically adjusted to move a beam closer to the position defined by the ideal parameters. Adjusting a moving a beam may be done in small increments and it may take several measurements and adjustments until a beam is positioned as defined by ideal position parameters. A camera may also be used to measure a spot area and spot size. A controller may automatically adjust a lens to adjust a target lens to set a spot size.

While not exhaustive or limiting, a control system used with an apparatus for use in LSP processes may be used to/for: configure and monitor an eDrive/oscillator (e.g. timing, pump current); configure and monitor timing generator; control and monitor laser safety; control and monitor laser output; control and monitor laser temperature (e.g. enclosure temperature, cooling water temperature, etc.); control output energy via adjustments to laser-head timings; control of overlay application; control and monitoring of final focusing lens; control and monitoring of final turning mirror; integration with an outside control system such as a robot; to store the configurations of components in the apparatus; store data collected by the apparatus for later processing; and to control access to the apparatus (e.g., limit apparatus access to authorized users).

While not exhaustive or limiting, sensor components of a control system used with an apparatus for LSP processes may sense and monitor: pulse width, pulse energy, a beam spatial profile, diode voltage, pump current, enclosure temperature, cooling water temperature, laser safety systems, and the health of the apparatus.

A control system, as described herein, may be used to automatically adjust: laser head timings; final focusing-lens position; final tuning-mirror position; overlay application timing; cooling system operation; and data collection. A control system may automatically adjust the energy of an output laser beam. A control system may automatically adjust diode voltage. Diode current may be controlled automatically by an eDrive.

Referring now to FIG. 20, a flow chart of an example method (2000) for automatic calibration and adjustment of an apparatus for use in LSP is provided. Method (2000) may include: adjusting a final focusing lens in an apparatus for LSP to a user-defined spot size prior to LSP of a target part (2001). The method may also include adjusting a position of a mirror on a laser beam delivery system based on a user-defined target location prior to LSP of the target part (2003). The method may also include calibrating an energy of a beam output by the apparatus by: firing a test laser at a calibrated energy meter to measure an energy of the test laser and comparing the measured energy of the test laser with a user-defined laser output energy (2005). The method may further include adjusting components of the apparatus for LSP and re-firing a test laser at the calibrated energy meter until the measured energy of the test laser is within a tolerance of the user-defined energy to calibrate the output beam (2007). The method may further include calibrating a spot size, a beam position, and a pulse width of a laser output by: firing a calibrated beam at a target part for LSP and measuring the calibrated beam parameters at a pickoff position in the beam (2009), and comparing the measured spot size, the measured position, and the measured pulse width against a user-defined spot size, position, and pulse width (2011). The method may further include repeatedly adjusting the parameters of the laser by adjusting the final focusing lens, adjusting the position of a mirror in a laser beam delivery device, and adjusting a pulse slicer, and re-measuring the spot size, the beam position, and the pulse width until the spot size, the beam position, and the pulse width are within a tolerance of the user-defined spot size, beam position, and pulse width (2013).

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail if such detail is not recited in the claims. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

As used in the specification and the claims, the singular forms "a," "an," and "the" include the plural. Furthermore, to the extent that the term "or" is employed in the claims (e.g., A or B) it is intended to mean "A or B or both." When the applicants intend to indicate "only A or B, but not both,"

then the term "only A or B but not both" will be employed. Similarly, when the applicants intend to indicate "one and only one" of A, B, or C, the applicants will employ the phrase "one and only one." Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. Finally, where the term "about" is used in conjunction with a number, it is intended to include ±10% of the number. In other words, "about 10" may mean from 9 to 11.

What is claimed is:

1. A multi-stage amplifier for use in an apparatus for laser shock peening, the multi-stage amplifier comprising:
    a first stage having a first amplifier module configured to first amplify a laser beam having a first energy output from the apparatus, to output a first amplified beam having a second energy, wherein the first stage comprises arranged in a sequential order: a first optical isolator, a first vacuum relay imaging module (VRIM), and the first amplifier module, such that the laser beam passes sequentially through the optical isolator, the first VRIM, and the first amplifier module to output the first amplified beam,
    wherein prior to the first amplifying to the second energy, the laser beam is collimated by the first VRIM to yield a larger diameter first collimated beam, and
    a second stage having a second amplifier module configured to second amplify the first amplified beam having the second energy to output a second amplified beam having a third energy, wherein the second stage comprises arranged in a sequential order: a second VRIM and the second amplifier module, such that the first amplified beam passes sequentially through the second VRIM and the second amplifier module to output the second amplified beam,
    wherein prior to the second amplifying to the third energy, the first amplified beam is collimated by the second VRIM to yield a larger diameter second collimated beam.

2. The multi-stage amplifier of claim 1, further comprising a third stage having a third amplifier module configured to third amplify the second amplified beam having the third energy to output a third amplified beam having a fourth energy, wherein the third stage comprises arranged in a sequential order: a second optical isolator, a third VRIM, and the third amplifier module, such that the second amplified beam passes sequentially through the second optical isolator, the third VRIM, and the third amplifier module to output the third amplified beam,
    wherein prior to the third amplifying to the fourth energy, the second amplified beam is collimated by the third VRIM to yield a larger diameter third collimated beam.

3. The multi-stage amplifier of claim 2, further comprising a fourth stage having a fourth amplifier module configured to amplify the third amplified beam from the fourth energy to a fifth energy, wherein the fourth stage comprises arranged in a sequential order: a fourth VRIM, a waveplate, and the fourth amplifier module, such that the third amplified beam passes sequentially through the fourth VRIM, the waveplate, and the fourth amplifier module to output an output beam,
    wherein prior to the fourth amplifying to the fifth energy, the third amplified beam is collimated by the fourth VRIM to yield a larger diameter fourth collimated beam.

4. The multi-stage amplifier of claim 1, wherein the apparatus comprises a diode-pumped solid-state laser (DPSSL) oscillator which outputs the laser beam as a pulsed laser beam, and the DPSSL oscillator comprises a first laser rod having a first diameter.

5. The multi-stage amplifier of claim 4, wherein prior to amplifying the pulsed laser beam, an energy level and a temporal profile of the pulsed laser beam from the DPSSL oscillator is modified by a modulator to a modified laser beam having a first spatial profile with a different energy level and a different temporal profile than the pulsed laser beam.

6. The multi-stage amplifier of claim 5, wherein prior to amplifying the pulsed laser beam, the first spatial profile of the modified laser beam is modified to a second spatial profile without modifying the energy level and the temporal profile of the modified laser beam when transmitting in a forward direction through an optical filter.

7. A method of amplifying a laser beam in an apparatus for laser shock peening, comprising:
    sequentially amplifying a laser beam generated by the apparatus by a multi-stage amplifier to output an amplified beam, wherein the sequentially amplifying comprises:
    amplifying by a first stage having a first amplifier module configured to first amplify the laser beam having a first energy output from the apparatus, to output a first amplified beam having a second energy, wherein the first stage comprises arranging in a sequential order: a first optical isolator, a first vacuum relay imaging module (VRIM), and the first amplifier module, such that the laser beam passes sequentially through the optical isolator, the first VRIM, and the first amplifier module to output the first amplified beam,
    wherein prior to the first amplifying to the second energy, the laser beam is collimated by the first VRIM to yield a larger diameter first collimated beam, and
    amplifying by a second stage having a second amplifier module configured to second amplify the first amplified beam having the second energy to output a second amplified beam having a third energy, wherein the second stage comprises arranged in a sequential order: a second VRIM and the second amplifier module, such that the first amplified beam passes sequentially through the second VRIM and the second amplifier module to output the second amplified beam,
    wherein prior to the second amplifying to the third energy, the first amplified beam is collimated by the second VRIM to yield a larger diameter second collimated beam.

8. The method of claim 7, further comprising:
    amplifying by a third stage having a third amplifier module configured to third amplify the second amplified beam having the third energy to output a third amplified beam having a fourth energy, wherein the third stage comprises arranged in a sequential order: a second optical isolator, a third VRIM, and the third amplifier module, such that the second amplified beam passes sequentially through the second optical isolator, the third VRIM, and the third amplifier module to output the third amplified beam, wherein prior to the third amplifying to the fourth energy, the second amplified beam is collimated by third VRIM to yield a larger diameter third collimated beam.

9. The method of claim 8, further comprising:

amplifying by a fourth stage having a fourth amplifier module configured to amplify the third amplified beam from the fourth energy to a fifth energy, wherein the fourth stage comprises arranged in a sequential order: a fourth VRIM, a waveplate, and the fourth amplifier module, such that the third amplified beam passes sequentially through the fourth VRIM, the waveplate, and the fourth amplifier module to output an output beam, wherein prior to the fourth amplifying to the fifth energy, the third amplified beam is collimated by the fourth VRIM to yield a larger diameter fourth collimated beam.

10. The method of claim 7, wherein the apparatus comprises a diode-pumped solid-state laser (DPSSL) oscillator which outputs the laser beam as a pulsed laser beam, and the DPSSL oscillator comprises a first laser rod having a first diameter.

11. The method of claim 10, wherein prior to amplifying the pulsed laser beam, an energy level and a temporal profile of the pulsed laser beam from the DPSSL oscillator is modified by a modulator to a modified laser beam having a first spatial profile with a different energy level and a different temporal profile than the pulsed laser beam.

12. The method of claim 11, wherein prior to amplifying the pulsed laser beam, the first spatial profile of the modified laser beam is modified to a second spatial profile without modifying the energy level and the temporal profile of the modified laser beam when transmitting in a forward direction through an optical filter.

13. An apparatus for use in laser shock peening, the apparatus comprising:

a diode-pumped solid-state laser (DPSSL) oscillator configured to output a pulsed laser beam having a first energy;

a modulator configured to receive the pulsed laser beam from the DPSSL oscillator to modify the pulsed laser beam having the first energy and a first temporal profile, to output a beam having the second energy and a second temporal profile; and an amplifier having multiple stages comprising:

a first stage having a first amplifier module configured to first amplify the beam having the second energy to output a first amplified beam having a third energy, wherein the first stage comprises arranged in a sequential order: a first optical isolator, a first vacuum relay imaging module VRIM, and the first amplifier module, such that the laser beam passes sequentially through the optical isolator, the first VRIM, and the first amplifier module to output the first amplified beam, wherein prior to the first amplifying to the third energy, the laser beam is collimated by the first VRIM to yield a larger diameter first collimated beam, and a second stage having a second amplifier module configured to second amplify the first amplified beam having the third energy to output a second amplified beam having a fourth energy, wherein the second stage comprises arranged in a sequential order: a second VRIM and the second amplifier module, such that the first amplified beam passes sequentially through the second VRIM and the second amplifier module to output the second amplified beam, wherein prior to the second amplifying to the fourth energy, the first amplified beam is collimated by the second VRIM to yield a larger diameter second collimated beam.

14. The apparatus of claim 13, wherein prior to amplifying the pulsed laser beam, the first spatial profile of the modified laser beam is modified to a second spatial profile without modifying the energy level and the temporal profile of the modified laser beam when transmitting in a forward direction through an optical filter.

15. The apparatus of claim 14, wherein the second spatial profile of the modified laser beam is preserved when passing through the first VRIM.

* * * * *